United States Patent
Ueno

(10) Patent No.: US 10,055,106 B2
(45) Date of Patent: Aug. 21, 2018

(54) INFORMATION DISPLAY PROCESSING SYSTEM, INFORMATION DISPLAY PROCESSING METHOD, AND PROGRAM RECORDING MEDIUM

(71) Applicant: NEC Corporation, Minato-ku, Tokyo (JP)

(72) Inventor: Mitsuyoshi Ueno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 508 days.

(21) Appl. No.: 14/728,084

(22) Filed: Jun. 2, 2015

(65) Prior Publication Data

US 2015/0355824 A1    Dec. 10, 2015

(30) Foreign Application Priority Data

Jun. 10, 2014  (JP) .................................. 2014-119156

(51) Int. Cl.
  *G06F 3/0484* (2013.01)
  *G06T 11/60* (2006.01)

(52) U.S. Cl.
  CPC ...... *G06F 3/04845* (2013.01); *G06F 3/04842* (2013.01); *G06F 3/04847* (2013.01); *G06T 11/60* (2013.01)

(58) Field of Classification Search
  None
  See application file for complete search history.

(56) References Cited

U.S. PATENT DOCUMENTS

| | | | |
|---|---|---|---|
| 2009/0021530 A1* | 1/2009 | Ishiguro .............. | G06F 3/04883 345/619 |
| 2010/0191729 A1* | 7/2010 | Ikeda ................ | G06F 17/30011 707/736 |
| 2012/0130954 A1* | 5/2012 | Hood ..................... | G06Q 10/10 707/640 |
| 2013/0085811 A1* | 4/2013 | Darden .................. | G06Q 10/00 705/7.38 |

FOREIGN PATENT DOCUMENTS

| | | |
|---|---|---|
| JP | 2004336289 A | 11/2004 |
| JP | 2010-176354 A | 8/2010 |
| JP | 2010-224666 A | 10/2010 |
| JP | 2011-135390 A | 7/2011 |

OTHER PUBLICATIONS

Japanese Office Action for JP Application No. 2014-119156 dated Feb. 6, 2018 with English Translation.

* cited by examiner

*Primary Examiner* — Tuan S Nguyen

(57) ABSTRACT

To identify a time period having an increased object editing amount in an editing image shared by multiple users and to extract the editing image in a desired state on the basis of the identified time period, an information display processing system includes: a display unit which displays information acquired in response to a predetermined request issued by at least one of multiple users; a data storing unit which stores data including user data identifying a user, editing-image data identifying an editing image, and object data identifying an object; and a processing unit which identifies, in response to the predetermined request, a time period having an object editing amount exceeding a predetermined threshold value as an editing-amount increasing time period by use of the data stored in the data storing unit and extracts an object edited in the identified editing-amount increasing time period.

6 Claims, 32 Drawing Sheets

Fig. 17

| OBJECT ID | POSITION | SIZE | UPDATE TIME AND DATE |
|---|---|---|---|
| 1 | (0,0) | (10,10) | 12/01 10:10 |
| 2 | (10,10) | (20,20) | 12/01 10:11 |
| 3 | (5,5) | (10,10) | 12/01 10:12 |
| 4 | (0,22) | (5,5) | 12/03 09:30 |
| 5 | (32,0) | (10,10) | 12/05 09:30 |
| 6 | (60,40) | (10,10) | 12/07 09:30 |
| 7 | (35,35) | (10,10) | 12/09 09:30 |
| 8 | (40,40) | (20,20) | 12/09 09:31 |
| 9 | (55,55) | (10,10) | 12/09 09:32 |

EDITING-AMOUNT INCREASING TIME PERIOD 1 (rows 1–3)

EDITING-AMOUNT INCREASING TIME PERIOD 2 (rows 7–9)

Fig. 22

| OBJECT ID | POSITION | SIZE | UPDATE DATE AND TIME | |
|---|---|---|---|---|
| 1 | (0,0) | (10,10) | 12/01 10:10 | ⎫ EDITING-AMOUNT INCREASING TIME PERIOD 1 |
| 2 | (10,10) | (20,20) | 12/01 10:11 | |
| 3 | (5,5) | (15,15) | 12/01 10:12 | ⎭ |
| 4 | (25,0) | (5,5) | 12/03 09:30 | |
| 5 | (30,0) | (10,10) | 12/03 09:31 | |
| 6 | (60,30) | (10,10) | 12/05 09:30 | |
| 7 | (70,30) | (10,10) | 12/05 09:31 | |
| 8 | (35,35) | (10,10) | 12/09 09:30 | ⎫ EDITING-AMOUNT INCREASING TIME PERIOD 2 |
| 9 | (40,40) | (20,20) | 12/09 09:31 | |
| 10 | (55,55) | (10,10) | 12/09 09:32 | ⎭ |

| USER ID | OBJECT ID | UPDATE DATE AND TIME |
|---|---|---|
| 1 | 1 | 12/01 10:10 |
|  | 2 | 12/01 10:20 |
|  | 3 | 12/01 10:30 |
| 2 | 1 | 12/01 10:15 |
|  | 2 | 12/01 10:25 |
|  | 3 | 12/01 10:35 |
| 3 | 1 | 12/01 13:10 |
|  | 2 | 12/01 13:12 |
|  | 3 | 12/01 13:15 |

| OBJECT ID | POSITION | SIZE | TAG | UPDATE DATE AND TIME |
|---|---|---|---|---|
| 1 | (0,0) | (10,10) | DESIGN | 12/01 10:10 |
| 2 | (10,10) | (20,20) | DESIGN | 12/01 10:11 |
| 3 | (5,5) | (10,10) | FUNCTION | 12/01 10:12 |
| 4 | (0,22) | (5,5) | FUNCTION | 12/03 09:30 |
| 5 | (32,0) | (10,10) | DESIGN | 12/05 09:30 |
| 6 | (60,40) | (10,10) | FUNCTION | 12/07 09:30 |
| 7 | (35,35) | (10,10) | FUNCTION | 12/09 09:30 |
| 8 | (40,40) | (20,20) | FUNCTION | 12/09 09:31 |
| 9 | (55,55) | (10,10) | DESIGN | 12/09 09:32 |

Rows 1–3: EDITING-AMOUNT INCREASING TIME PERIOD 1
Rows 6–8: EDITING-AMOUNT INCREASING TIME PERIOD 2

| OBJECT ID | POSITION | SIZE | TAG | UPDATE DATE AND TIME | |
|---|---|---|---|---|---|
| 1 | (0,0) | (10,10) | DESIGN | 12/01 10:10 | ⎫ EDITING-AMOUNT INCREASING TIME PERIOD 1 |
| 2 | (10,10) | (20,20) | DESIGN | 12/01 10:11 | |
| 3 | (5,5) | (15,15) | FUNCTION | 12/01 10:12 | ⎭ |
| 4 | (25,0) | (5,5) | FUNCTION | 12/03 09:30 | ⎫ GROUP 1 ⎭ |
| 5 | (30,0) | (10,10) | DESIGN | 12/03 09:31 | |
| 6 | (55,20) | (10,10) | FUNCTION | 12/05 09:30 | ⎫ GROUP 2 ⎭ |
| 7 | (65,20) | (10,10) | TEST | 12/05 09:31 | |
| 8 | (35,35) | (10,10) | FUNCTION | 12/09 09:30 | ⎫ EDITING-AMOUNT INCREASING TIME PERIOD 2 |
| 9 | (40,40) | (20,20) | FUNCTION | 12/09 09:31 | |
| 10 | (55,55) | (10,10) | FUNCTION | 12/09 09:32 | ⎭ |

520

INFORMATION DISPLAY PROCESSING SYSTEM, INFORMATION DISPLAY PROCESSING METHOD, AND PROGRAM RECORDING MEDIUM

This application is based upon and claims the benefit of priority from Japanese Patent Application No. 2014-119156, filed on Jun. 10, 2014, the disclosure of which is incorporated herein in its entirety by reference.

TECHNICAL FIELD

The present invention relates to an information display processing system, an information display processing method, and an information display processing program. In particular, the present invention relates to an information display processing system, an information display processing method, and an information display processing program which are for processing an editing image shared via a network.

BACKGROUND ART

An online whiteboard is an application which enables multiple users to share information by the use of objects such as text and figures via a network. Using an online whiteboard, multiple users can synchronously add or modify a text object for inputting text to a whiteboard or a figure object for drawing a figure on a whiteboard, from multiple terminals. In addition, an online whiteboard can provide multiple whiteboards for activities such as discussions and work operations. Hence, it is conceivable for a whiteboard to deal with various situations such as one in which multiple users have a discussion about a common theme and one in which multiple users make reviews of or make comments on the whiteboard at different time points.

Regarding a whiteboard, there is a tendency for a single or multiple users to add or update an object for a discussion or a work operation within a particular time period. Users have a desire to view the state of the whiteboard corresponding to a certain previous time point and a desire to check, on the basis of difference between particular time periods to be displayed, the objects added or modified between the particular time periods. To fulfill such user desires, sharable online whiteboards generally have the function of showing the state of a whiteboard corresponding to a certain previous time point and the function of displaying difference between particular time periods.

Japanese Patent Application Publication No. 2004-336289 discloses a whiteboard record reconstructing method for reconstructing operations performed on a whiteboard in a shared-whiteboard system including a server and a client connected to each other via a network.

In the method of Japanese Patent Application Publication No. 2004-336289, to store information on an input on a whiteboard, the client or the server stores, as a file, a snapshot of the information on the input on the whiteboard. The corresponding one of the client and the server stores following operations performed on the whiteboard, as records, in the file together with time information in accordance with a certain rule. Through the use of the method of Japanese Patent Application Publication No. 2004-336289, it is possible to reconstruct operations performed on a whiteboard on the basis of a stored snapshot and stored records.

SUMMARY

The present invention has an object to provide an information display processing system which identifies a time period having an increased object-editing amount on an editing image shared by multiple users and which extracts the editing image in a desired state on the basis of the identified time period.

An information display processing system of the present invention includes: a display unit which displays information acquired in response to a request issued by at least one of multiple users sharing information by use of an editing image shared via a network; a data storing unit which stores data including user data identifying a user, editing-image data identifying an editing image, and object data identifying an object; and a processing unit which identifies, in response to the user request, a time period having an object editing amount exceeding a predetermined threshold value, as an editing-amount increasing time period by use of the data stored in the data storing unit and extracts an object edited in the identified editing-amount increasing time period.

An information display processing method of the present invention includes: displaying information acquired in response to a request issued by at least one of multiple users sharing information by use of an editing image shared via a network; storing data including user data identifying a user, editing-image data identifying an editing image, and object data identifying an object; identifying, in response to the user request, a time period having an object editing amount exceeding a predetermined threshold value as an editing-amount increasing time period by use of the stored data; and extracting an object edited in the identified editing-amount increasing time period.

A program recording medium which records an information display processing program of the present invention causes a computer to execute: a process of displaying information acquired in response to a request issued by at least one of multiple users sharing information by use of an editing image shared via a network; a process of storing data including user data identifying a user, editing-image data identifying an editing image, and object data identifying an object; a process of identifying, in response to the user request, a time period having an object editing amount exceeding a predetermined threshold value as an editing-amount increasing time period by use of the stored data; and a process of extracting an object edited in the identified editing-amount increasing time period.

BRIEF DESCRIPTION OF THE DRAWINGS

Exemplary features and advantages of the present invention will become apparent from the following detailed description when taken with the accompanying drawings in which:

FIG. 17 is an example of a table schematically displaying part of object data of the information display processing system according to the first exemplary embodiment of the present invention;

FIG. 22 is an example of a table schematically displaying part of object data of the information display processing system according to the third exemplary embodiment of the present invention;

FIG. 24 is an example of a table schematically displaying part of object data used in an information display processing system according to a fourth exemplary embodiment of the present invention;

FIG. 28 is an example of a table schematically displaying part of object data used in the information display processing system according to the fifth exemplary embodiment of the present invention;

FIG. 31 is an example of a table schematically displaying part of object data used in the information display processing system according to the fifth exemplary embodiment of the present invention.

EXEMPLARY EMBODIMENT

Exemplary embodiments for carrying out the present invention are described below with reference to the drawings. Note that, although the following exemplary embodiments include technical limitations preferable for carrying out the present invention, the scope of the invention is not limited to the exemplary embodiments described below.

First Exemplary Embodiment (Configuration)

First, a configuration of an information display processing system 1 according to a first exemplary embodiment of the present invention is described with reference to the drawings. Description is given on the assumption that the information display processing system 1 according to this exemplary embodiment is an online whiteboard. An online whiteboard serves to enable multiple users to share information by the use of a shared editing image via a network. In the following description, an online whiteboard is referred to simply as whiteboard.

An editing image corresponds to a whiteboard itself in a broad sense. Alternatively, an editing image may be considered as a group of objects arranged on a whiteboard. An editing image may alternatively be image information indicating the arrangement of the objects on a whiteboard at a particular time point. Note that the information display processing system 1 according to this exemplary embodiment displays, as an editing image, the arrangement of the objects on a whiteboard at any time point including a particular time point but not limiting to the particular time point.

Figure 1:
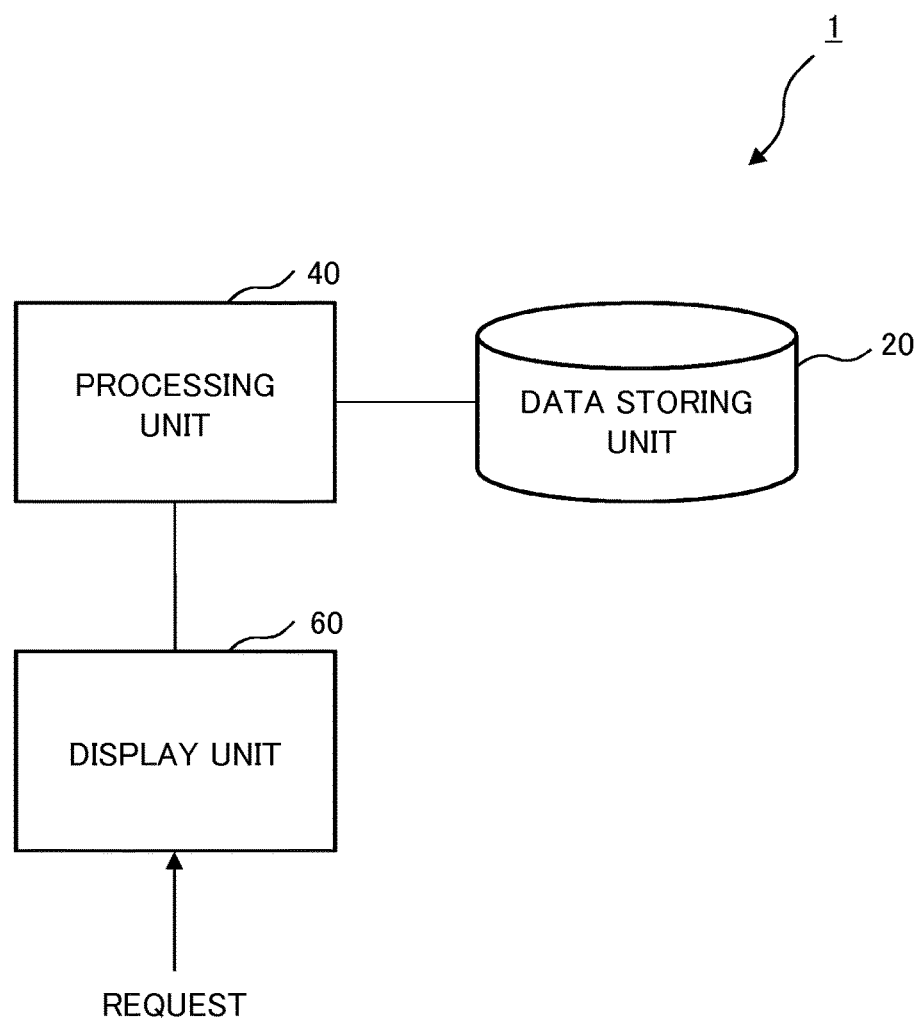
FIG. 1 is a block diagram illustrating a functional configuration of an information display processing system according to a first exemplary embodiment of the present invention.
Figure 2:
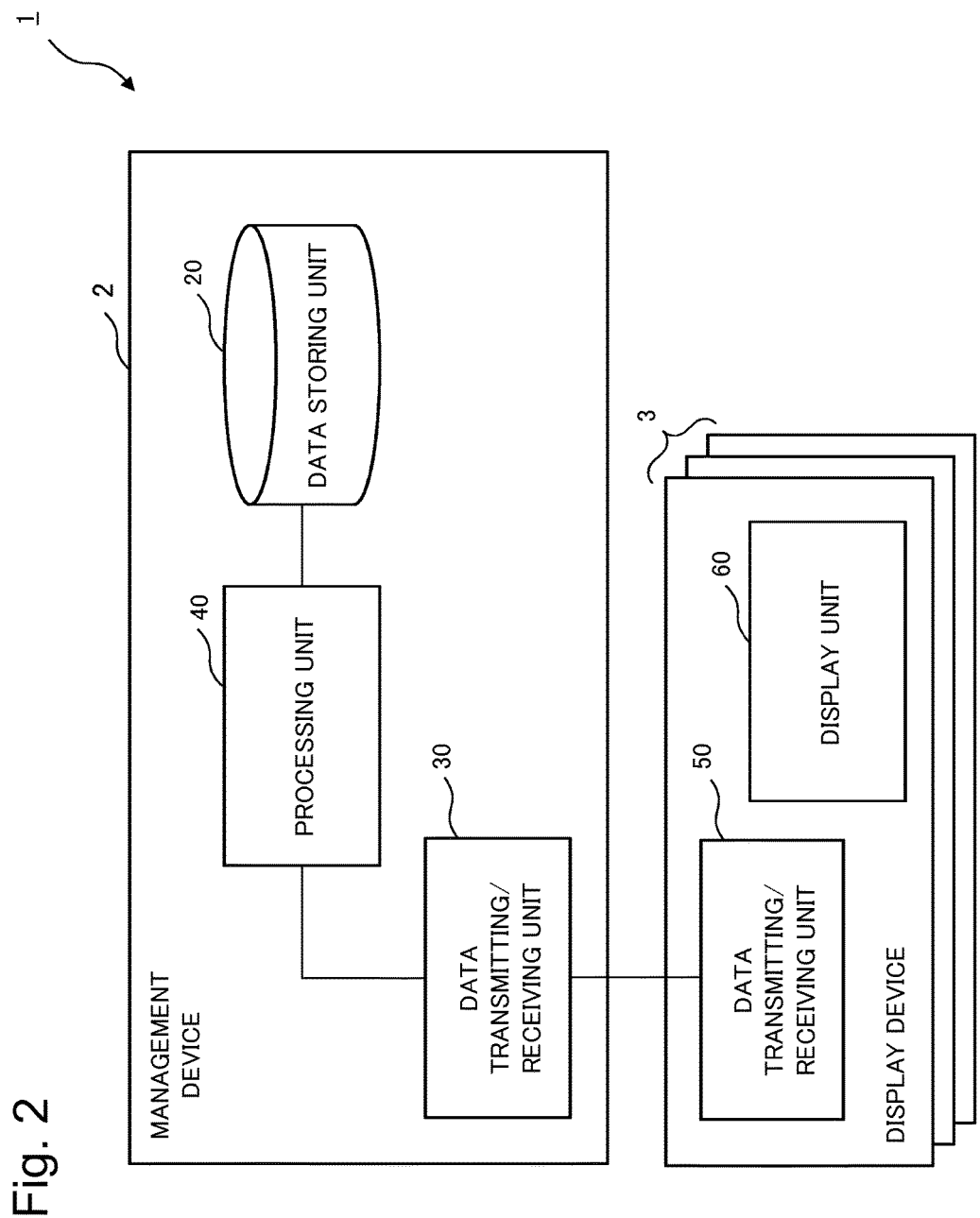
FIG. 2 is a block diagram illustrating a configuration of the information display processing system according to the first exemplary embodiment of the present invention.

As illustrated in FIG. 1, the information display processing system 1 according to this exemplary embodiment includes a data storing unit 20, a processing unit 40, and a display unit 60. As illustrated in FIG. 2, the processing unit 40 and the data storing unit 20 are included in a management device 2, and the display unit 60 is included in a display device 3.

(Management Device)

The management device 2 manages data on each whiteboard. In addition, the management device 2 carries out processing corresponding to a request from the display device 3 and transmits the result of the processing to the display device 3 when appropriate. The request from the display device 3 corresponds to a predetermined request specified by at least one of multiple users sharing information by use of a shared editing image via a network.

As illustrated in FIG. 2, the management device 2 includes the processing unit 40, a data transmitting/receiving unit 30, and the data storing unit 20. The management device 2 may be implemented using an information processor such as a server or a computer, although hardware for implementing the management device 2 is not limited to the above examples.

The processing unit 40 processes the editing amount of the objects added or modified on the whiteboard and identifies, as an editing-amount increasing time period, each time period having an editing amount exceeding a predetermined threshold value. The processing unit 40 extracts the difference of each object added or modified between different editing-amount increasing time periods. Note that "addition or modification" of an object is referred to also as "editing" of an object below. "Modification" of an object is the same as "update" of an object.

Figure 3:
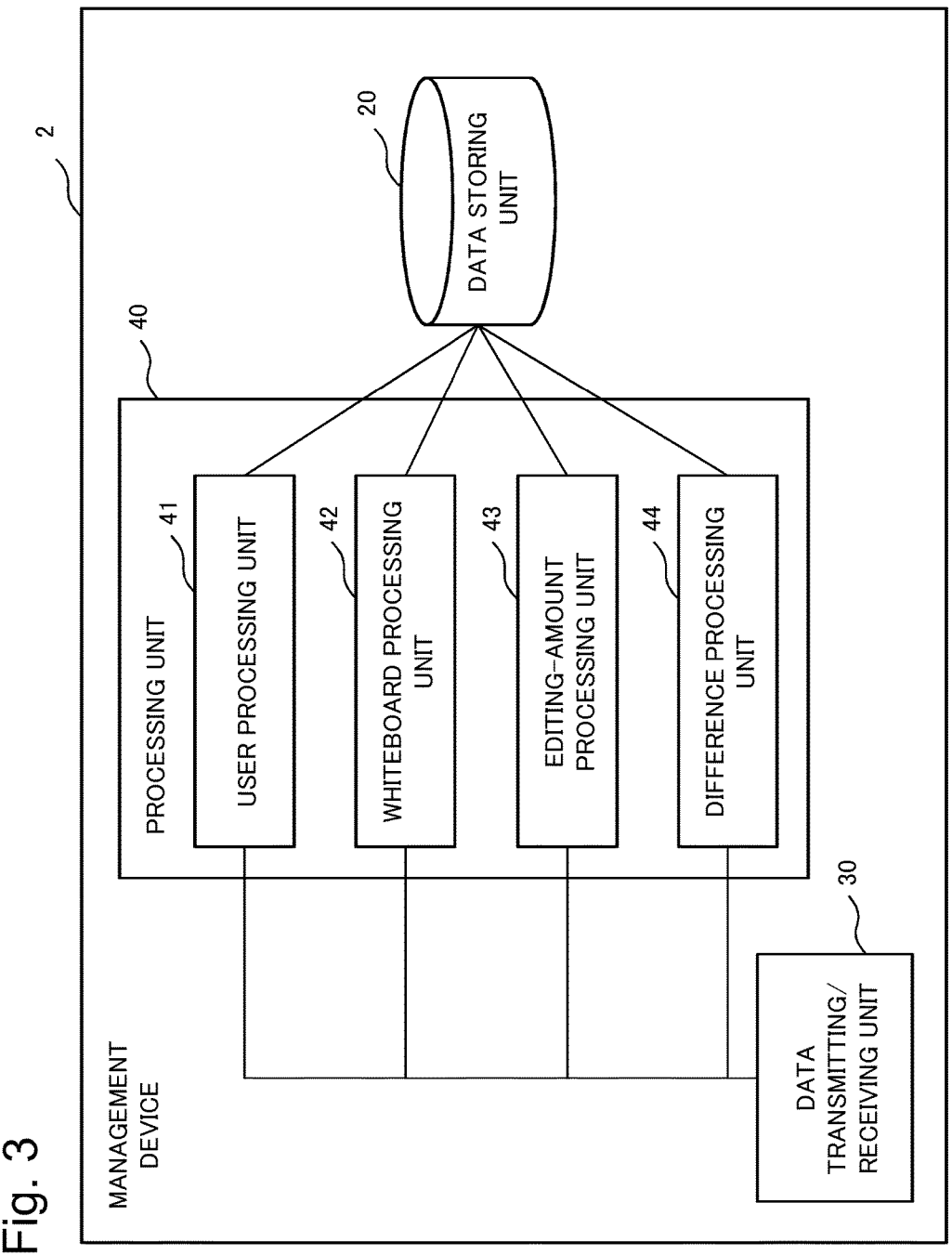
FIG. 3 is a block diagram illustrating an internal configuration of a processing unit of a management device included in the information display processing system according to the first exemplary embodiment of the present invention.

As illustrated in FIG. 3, the processing unit 40 includes a user processing unit 41, a whiteboard processing unit 42, an editing-amount processing unit 43, and a difference processing unit 44.

The user processing unit 41 checks whether a user identifier (ID) is stored in the management device 2. A user ID is referred to also as a user identifier. Details of a process by the user processing unit 41 are described later.

The whiteboard processing unit 42 assigns identification numbers (IDs) to whiteboards and objects and manages the IDs. Details of processing by the whiteboard processing unit 42 are described later.

The editing-amount processing unit 43 identifies each editing-amount increasing time period, in which the editing amount of the objects on the whiteboard exceeds the predetermined threshold value.

Figure 4:
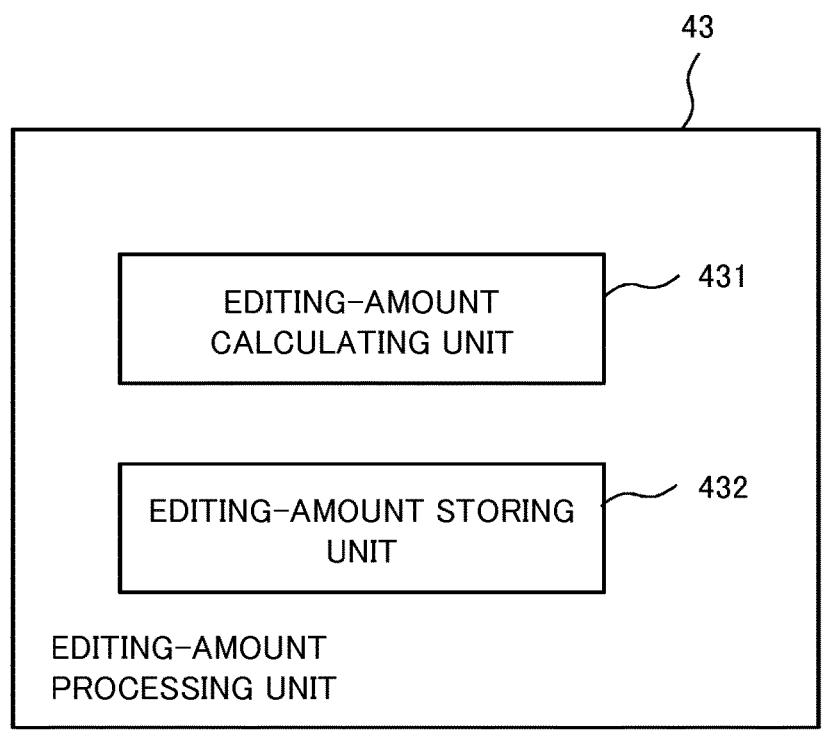
FIG. 4 is a block diagram illustrating an internal configuration of an editing-amount processing unit included in the processing unit of the management device included in the information display processing system according to the first exemplary embodiment of the present invention.

As illustrated in FIG. 4, the editing-amount processing unit 43 includes an editing-amount calculating unit 431 and an editing-amount storing unit 432.

The editing-amount calculating unit 431, for example, calculates the average editing amount in a specified time range, calculates a threshold value Smax to be used for determination about editing-amount increasing time period, and calculates the editing amount per unit time, on the basis of the object set of each whiteboard ID. For example, assume that the number of times an object is edited corresponds to the number of versions for a corresponding object ID. In this case, the editing-amount calculating unit 431 calculates the editing amount per unit time by multiplying the number of object IDs included in a specified time period by the number of versions for the individual object IDs. Moreover, the editing-amount calculating unit 431 creates an editing-amount graph representing transition of an editing amount per unit time with time in a histogram. The editing-amount calculating unit 431 identifies, as an editing-amount increasing time period, each time period having the calculated editing amount exceeding the threshold value Smax in the created editing-amount graph.

The editing-amount storing unit 432 stores related data for each whiteboard ID for which editing-amount increasing time periods have been identified. Details of the editing-amount processing unit 43 including the editing-amount calculating unit 431 and the editing-amount storing unit 432 are described later.

The difference processing unit 44 identifies the objects edited in each editing-amount increasing time period identified by the editing-amount processing unit 43 and performs processing corresponding to the request from the display device 3.

Figure 5:
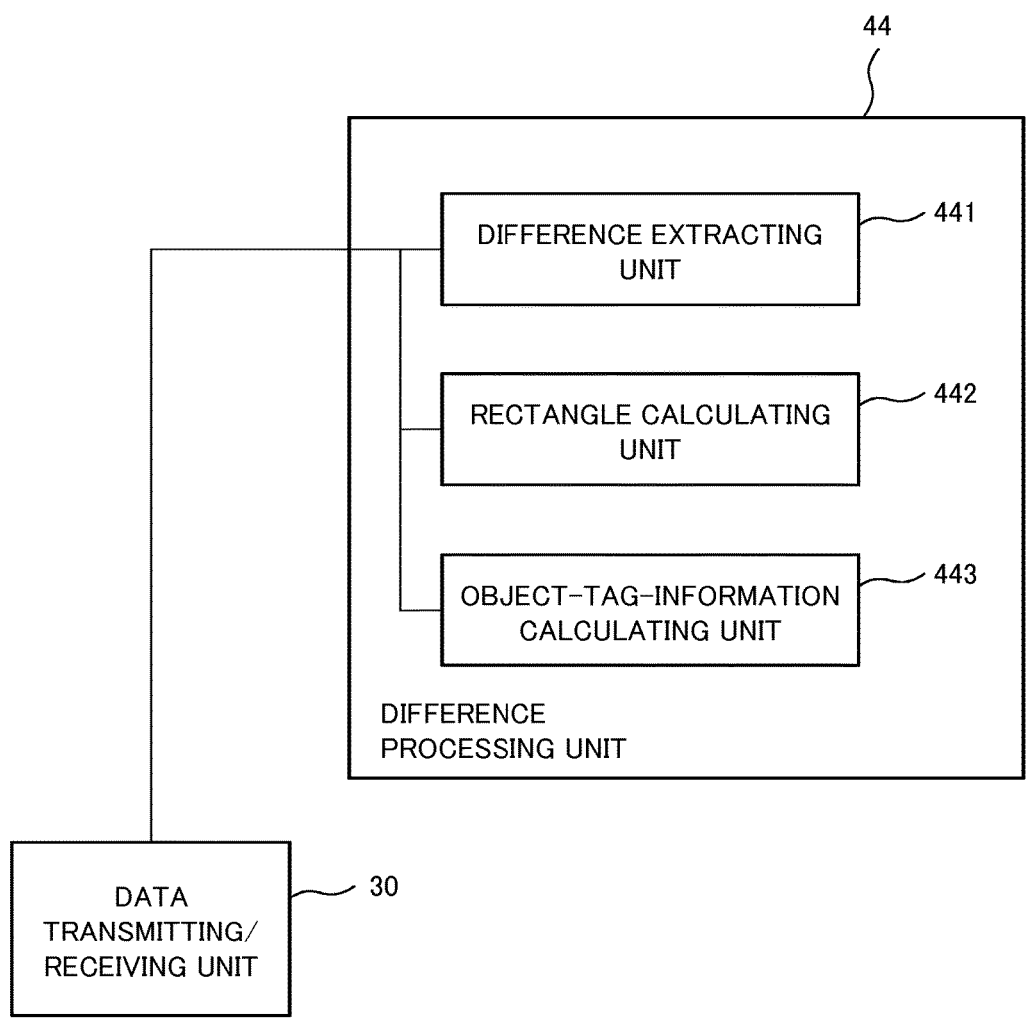
FIG. 5 is a block diagram illustrating an internal configuration of a difference processing unit included in the processing unit of the management device included in the information display processing system according to the first exemplary embodiment of the present invention.

As illustrated in FIG. 5, the difference processing unit 44 includes a difference extracting unit 441, a rectangle calculating unit 442, and an object-tag-information calculating unit 443.

Figure 6:
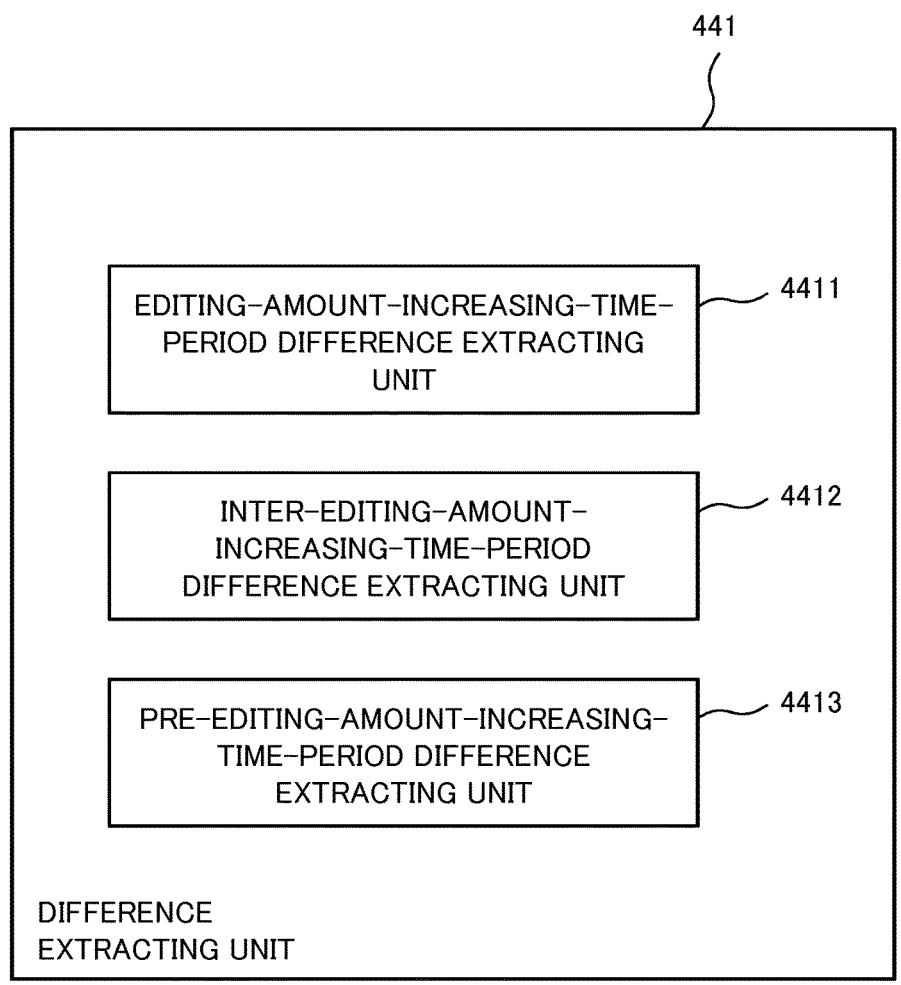
FIG. 6 is a block diagram illustrating an internal configuration of a difference extracting unit of the difference processing unit included in the processing unit of the management device included in the information display processing system according to the first exemplary embodiment of the present invention.

As illustrated in FIG. 6, the difference extracting unit 441 includes an editing-amount-increasing-time-period difference extracting unit 4411, an inter-editing-amount-increasing-time-period difference extracting unit 4412, and a pre-editing-amount-increasing-time-period difference extracting unit 4413.

The editing-amount-increasing-time-period difference extracting unit 4411 extracts difference of each object edited in a target editing-amount increasing time period.

The inter-editing-amount-increasing-time-period difference extracting unit 4412 extracts the difference of each object edited between different editing-amount increasing time periods.

The pre-editing-amount-increasing-time period difference extracting unit 4413 extracts the difference of each object edited prior to a target editing-amount increasing time period.

The rectangle calculating unit 442 calculates the position and size of each object and calculates the area of each part in which different objects overlap. In addition, when the objects edited in a particular editing-amount increasing time period are treated as a group, the rectangle calculating unit 442 functions also as a unit which defines the group of objects as a rectangle.

The object-tag-information calculating unit 443 calculates the tag information of the objects edited in each editing-amount increasing time period. Specifically, the object-tag-information calculating unit 443 retrieves the tag information assigned to each object, counts the number of tags of each kind, and calculates a numerical value TP for each kind of tags. The numerical value TP corresponds to the number of objects to which a particular tag is assigned in an object set.

The data transmitting/receiving unit 30 receives a request and data from the display device 3 and transmits a processing result obtained by each processing unit. The data transmitting/receiving unit 30 functions as a communication interface of the management device 2.

Figure 7:
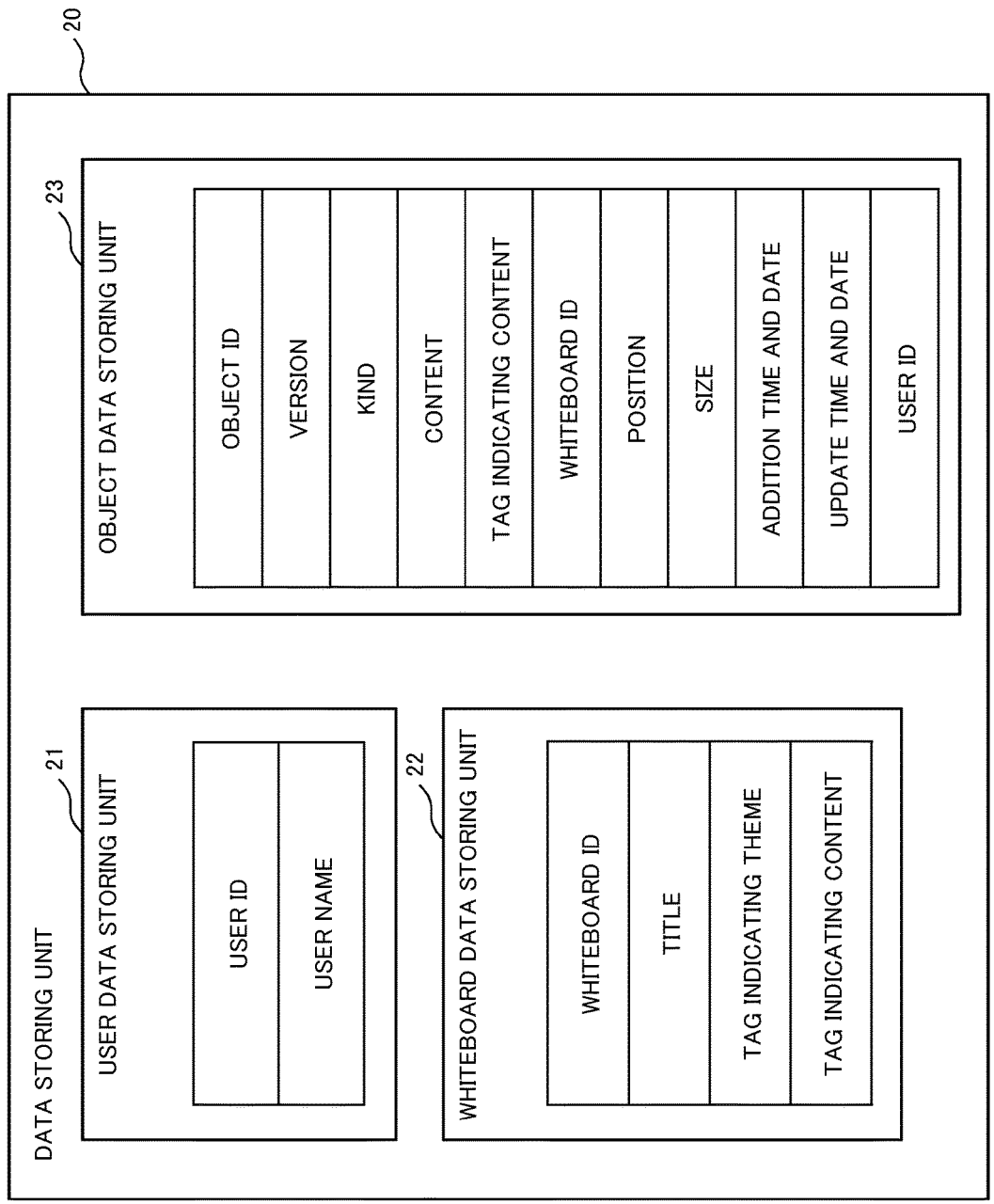
FIG. 7 is a block diagram illustrating an internal configuration of a data storing unit of the management device included in the information display processing system according to the first exemplary embodiment of the present invention.

As illustrated in FIG. 7, the data storing unit 20 includes a user data storing unit 21, a whiteboard data storing unit 22, and an object data storing unit 23.

The user data storing unit 21 stores user data, which identifies each user. The user data includes a user ID, which uniquely identifies the user, and a user name, which is the name of the user.

The whiteboard data storing unit 22 stores whiteboard data (referred to also as editing-image data), which identifies each whiteboard. The whiteboard data includes a whiteboard ID, which uniquely identifies the whiteboard, the title of the whiteboard, a tag indicating the theme of the whiteboard, and a tag indicating the content of the whiteboard.

Tag information indicating the theme or the content of the whiteboard includes a character string, which represents the theme or the content of the discussion on the whiteboard. In general, a discussion on a single theme is carried out in multiple whiteboards, so that the same kind of tag is assigned to the multiple whiteboards in such a case.

The object data storing unit 23 stores object data, which identifies each object. The object data includes an object ID, which uniquely identifies the object, the versions of the object, the type of object, the content of the object, and a tag indicating the content of the object. In addition to the above, the object data includes the whiteboard ID of the whiteboard in which the object is included, the position information, the size information, the time and date of the addition, the time and date of each update, and the user IDs of the users who added or modified the object.

The tag indicating the content of the object includes a character string representing the content of the object. Objects representing the same content are provided with the respective identical tags indicating the content.

The position information of the object indicates the position of the object on the whiteboard. The position information of the object is defined using the coordinates on the horizontal axis (x axis) and the vertical axis (y axis) on the whiteboard.

The size information of the object indicates the size of the rectangle of the object. The size information of the object is defined using the widths of the object in the horizontal-axis direction and the vertical-axis direction on the whiteboard. The rectangle of the object is a rectangular area surrounding the object. The rectangle of the object may be defined in a state of being in contact with the periphery of the object or having a certain distance from the periphery of the object.

(Display Device)

The display device 3 is connected to the management device 2 via the network and displays information regarding each whiteboard. The display device 3 includes at least one piece of hardware. The display device 3 also issues, to the management device 2, a request for logging in to a whiteboard, a request for displaying, creating, or updating a whiteboard, a request for adding or modifying an object, an editing-amount display request, and a difference display request. Description is given later of individual requests issued by the display device 3.

As illustrated in FIG. 2, the display device 3 includes a data transmitting/receiving unit 50 and a display unit 60. The display device 3 may be implemented using a terminal unit which has a display function, such as a laptop computer (PC), a tablet PC, a smartphone, or a mobile phone, although hardware for implementing the display device 3 is not limited to the these examples.

The data transmitting/receiving unit 50 transmits a request to the management device 2 and exchanges data with the management device 2. The data transmitting/receiving unit 50 functions as a communication interface of the display device 3.

The display unit 60 displays a whiteboard and necessary information. A user makes a log-in request, a request for displaying, creating, or updating a whiteboard, a request for adding or modifying an object on a whiteboard, an editing-amount display request, and a difference display request, through the use of the display unit 60. The display unit 60 issues such a request to the management device 2 via the data transmitting/receiving unit 50. The display device 3 instructs the display unit 60 to display a response to the request transmitted to the management device 2. Alternatively, a request to be transmitted by the display device 3 may be input by an input unit (not illustrated) different from the display unit 60.

To display difference on the display unit 60 of the display device 3, the display device 3 needs to issue an editing-amount display request. Upon issue of an editing-amount display request by the display device 3, the display unit 60 displays time periods in which a discussion or a work operation has been performed, in response to the editing-amount display request.

When a time period for which difference is desired to be displayed is selected, the display device 3 issues a difference display request to the management device 2. The management device 2 calculates the difference generated in the requested time period, in which a discussion or a work operation has been performed, and returns the processing result to the display device 3. Upon receipt of the result, the display unit 60 of the display device 3 displays the difference requested to be displayed. The timing at which a difference display request is issued may be a particular time point set in advance or may be in parallel with the start or end of particular processing.

In the case where the display device 3 is implemented as a terminal unit, the display unit 60 functions as a device which displays information on a monitor included in the terminal unit. For example, the display unit 60 may be equipped with a monitor, which displays a whiteboard and related information, and a device, which inputs and processes information. The display unit 60 is a general device including a monitor, which displays information, and a device which performs processing for displaying information on the monitor. For example, a terminal such as a desktop PC, a laptop PC, a tablet PC, a smartphone, or a mobile phone may be used as the display device 3.

Alternatively, multiple display units 60 may be associated with the single display device 3, for example. In this case, the display device 3 instructs a screen or a monitor which can be shared by users to display a whiteboard, and the users operate the whiteboard through the use of multiple terminals. Note that the configuration of the display device 3 may be changed appropriately according to the situation of use and is hence not limited to the above example.

Description is given above of the functional configuration of the information display processing system 1 according to this exemplary embodiment of the present invention.

Next, description is given of a request which the display device 3 issues to the management device 2 in processing in the information display processing system 1 according to this exemplary embodiment of the present invention. A request which the management device 2 receives is input by at least one of multiple users of a whiteboard. Among the users of a whiteboard, some edit the whiteboard while others simply browse the whiteboard. Hence, not necessarily all the users input a request.

In conceivable situations of using a whiteboard, it is often the case that a request input to a terminal, such as a laptop PC or a smartphone, including the display device 3 is transmitted to the management device 2. However, a display function may not be included in user terminals, for example, in a situation of using a screen at a stadium or a cinema as a whiteboard. In such a case, a request to the management device 2 may be issued by a terminal not including the display device 3.

Examples of a request which the management device 2 receives from the display device 3 are a "user log-in request", a "whiteboard display request", a "whiteboard creation request", an "object addition/modification request", an "editing-amount display request", and a "difference display request". The management device 2 receives any of these requests and data corresponding to the request, performs corresponding processing, and transmits a processing result to the display device 3.

[User Log-in Request]

A user log-in request is issued by the display device 3 when a user is to log in to a system using an online whiteboard.

With the user log-in request, the management device 2 receives a user ID at the data transmitting/receiving unit 30.

Upon receipt of the user ID, the data transmitting/receiving unit 30 passes the received user ID to the user processing unit 41 of the processing unit 40. Upon receipt of the user ID, the user processing unit 41 checks whether the received user ID is stored in the user data storing unit 21 of the data storing unit 20. When the user ID is stored in the user data storing unit 21, the user processing unit 41 returns a result indicating that the login is possible, to the data transmitting/receiving unit 30. When the user ID is not stored in the user data storing unit 21, the user processing unit 41 returns a result indicating that the login is not possible, to the data transmitting/receiving unit 30.

The data transmitting/receiving unit 30 requests the whiteboard processing unit 42 to provide information on a whiteboard list including whiteboard IDs and titles. In response to the request from the data transmitting/receiving unit 30, the whiteboard processing unit 42 returns the information on the whiteboard list to the data transmitting/receiving unit 30.

Upon acquisition of the whiteboard list, the data transmitting/receiving unit 30 transmits the acquired whiteboard list to the display device 3.

Upon receipt of the whiteboard list from the management device 2, the data transmitting/receiving unit 50 of the display device 3 passes the received whiteboard list to the display unit 60. The display unit 60 displays the received whiteboard list.

As described above, in response to the user log-in request, the processing unit 40 of the management device 2 checks, at the user processing unit 41, whether it is possible for the user to log in to the system, and returns the processing result to the display device 3.

[Whiteboard Display Request]

A whiteboard display request is issued by the display device 3 when the display unit 60 of the display device 3 is to display the whiteboard corresponding to the whiteboard ID of a whiteboard used by the user.

The data transmitting/receiving unit 30 of the management device 2 receives a whiteboard ID with a whiteboard display request.

Upon receipt of the whiteboard ID, the data transmitting/receiving unit 30 passes the received whiteboard ID to the whiteboard processing unit 42 of the processing unit 40 and requests to acquire corresponding data. The whiteboard processing unit 42 retrieves the latest list of objects (referred to as an object set) from the object data storing unit 23 by using the whiteboard ID as a key and returns the retrieved object set to the data transmitting/receiving unit 30. Upon acquisition of the latest object set, the data transmitting/receiving unit 30 transmits the acquired object set to the display device 3.

Upon receipt of the object set, the data transmitting/receiving unit 50 of the display device 3 passes the received object set to the display unit 60. The display unit 60 displays the received object set.

As described above, in response to the whiteboard display request, the processing unit 40 of the management device 2 acquires, at the whiteboard processing unit 42, corresponding data from the whiteboard data storing unit 22 and returns the acquired data to the display device 3.

[Whiteboard Creation Request]

A whiteboard creation request is issued by the display device 3 to create a new whiteboard.

The management device 2 receives, at the data transmitting/receiving unit 30, data on a whiteboard with a whiteboard creation request. The data on a whiteboard includes the title of the whiteboard, the tag indicating the theme of the whiteboard, and the tag indicating the content of the whiteboard.

The data transmitting/receiving unit 30 passes the received data on the whiteboard to the whiteboard processing unit 42 of the processing unit 40.

The whiteboard processing unit 42 assigns a whiteboard ID to the whiteboard to be created, on the basis of the received data on the whiteboard, and stores the data on the whiteboard to be created, in the whiteboard data storing unit 22.

As described above, in response to the whiteboard creation request, the processing unit 40 of the management device 2 stores, at the whiteboard processing unit 42, the data on the whiteboard to be created, in the whiteboard data storing unit 22 of the data storing unit 20.

[Object Addition/Modification Request]

An object addition/modification request is issued by the display device 3 to add or modify an object on a whiteboard. Data on an object includes an object ID, the type of object, the content of the object, a tag indicating the content of the object, the whiteboard ID of the whiteboard in which the object is included, position information, size information, and the user IDs of the users who have added or modified the object. The size information indicates the size of the rectangle of the object.

The management device 2 receives, at the data transmitting/receiving unit 30, different pieces of information depending on whether object addition is requested or object modification is requested, with an object addition/modification request. In the case of object addition, the data transmitting/receiving unit 30 receives data on an object to be added. In contrast, in the case of object modification, the data transmitting/receiving unit 30 receives data on an object to be modified.

In any cases of object addition and object modification, the data transmitting/receiving unit 30 passes the received data to the whiteboard processing unit 42 of the processing unit 40. In the case of object addition, the whiteboard processing unit 42 assigns a new object ID to the object and stores the data in the object data storing unit 23. In the case of object modification, the whiteboard processing unit 42 increments the version number of the target object by 1 and stores the data in the object data storing unit 23. Note that, when the data is stored, the date and time at which the data is stored in the whiteboard processing unit 42 are stored as addition/update time and date without modifying the object ID.

As described above, in response to the object addition/modification request, the processing unit 40 of the management device 2 stores, at the whiteboard processing unit 42, the data obtained by the object addition/modification, in the object data storing unit 23 of the data storing unit 20.

[Editing-Amount Display Request]

An editing-amount display request is issued by the display unit 60 to display the editing amount for a specified time period.

The data transmitting/receiving unit 30 of the management device 2 receives information on the time range for which the editing amount is to be displayed and a target theme of whiteboards, with an editing-amount display request. Information on a time range for which the editing amount is to be displayed is referred to also as a particular period.

The data transmitting/receiving unit 30 passes the received data to the editing-amount processing unit 43 of the processing unit 40. The editing-amount processing unit 43 calculates, at the editing-amount calculating unit 431, the editing amount and passes the calculation result to the data transmitting/receiving unit 30. The data transmitting/receiving unit 30 returns the received calculation result obtained by the editing-amount calculating unit 431 to the display device 3.

The display device 3 instructs the display unit 60 to display the received calculation result when appropriate.

As described above, in response to the editing-amount display request, the management device 2 retrieves data from the data storing unit 20 and analyzes the data to identify time periods each having a large editing amount, at the editing-amount processing unit 43 of the processing unit 40, and returns the analysis result to the display device 3.

[Difference Display Request]

A difference display request is issued by the display device 3 to display difference generated in a particular editing-amount increasing time period.

The management device 2 receives, at the data transmitting/receiving unit 30, a request, for example, for "highlighting an object added/modified in an editing-amount increasing time period", "displaying the state of a whiteboard prior to an editing-amount increasing time period", or "highlighting the difference generated between the editing-amount increasing time periods", as a difference display request. A request for "highlighting an object added/modified in an editing-amount increasing time period" is referred to also as an editing-amount-increasing-time-period difference display request. A request for "displaying the state of a whiteboard prior to the editing-amount increasing time period" is referred to also as a pre-editing-amount-increasing-time-period difference display request. A request for "highlighting the difference generated between the editing-amount increasing time periods" is referred to also as an inter-editing-amount-increasing-time-period difference display request.

In the case of an editing-amount-increasing-time-period difference display request or a pre-editing-amount-increasing-time-period difference display request, the data transmitting/receiving unit 30 receives a single editing-amount increasing time period. In contrast, in the case of an inter-editing-amount-increasing-time-period difference display request, the data transmitting/receiving unit 30 receives two editing-amount increasing time periods.

In the case of an editing-amount-increasing-time-period difference display request, the data transmitting/receiving unit 30 passes data on the received editing-amount increasing time period to the editing-amount-increasing-time-period difference extracting unit 4411 included in the difference processing unit 44 of the processing unit 40.

In the case of an inter-editing-amount-increasing-time-period difference display request, the data transmitting/receiving unit 30 passes data on each of the received editing-amount increasing time periods to the inter-editing-amount-increasing-time-period difference extracting unit 4412 included in the difference processing unit 44 of the processing unit 40.

In the case of a pre-editing-amount-increasing-time-period difference display request, the data transmitting/receiving unit 30 passes data on the received editing-amount increasing time period to the pre-editing-amount-increasing-time-period difference extracting unit 4413 included in the difference processing unit 44 of the processing unit 40.

Each of the editing-amount-increasing-time-period difference extracting unit 4411, the inter-editing-amount-increasing-time-period difference extracting unit 4412, and the pre-editing-amount-increasing-time-period difference extracting unit 4413 processes the received data and passes the processing result to the data transmitting/receiving unit 30. The data transmitting/receiving unit 30 returns the received processing result to the display device 3.

The display device 3 instructs the display unit 60 to display the received data.

As described above, through the difference display request, the processing unit 40 of the management device 2 receives the information on the time period for which the difference is to be displayed from the display device 3, and the difference processing unit 44 extracts data necessary for the difference display from the data storing unit 20 and returns the extracted data to the display device 3.

In the case of an inter-editing-amount-increasing-time-period difference display request, it is necessary to determine, for each addition/modification of an object between editing-amount increasing time periods, which time period is to include the update made between the time periods. For the determination, the management device 2 uses the rectangle calculating unit 442 and the object-tag-information calculating unit 443.

The rectangle calculating unit 442 defines a rectangular area (referred to also as a rectangle for an editing-amount increasing time period below) indicating the range of the objects edited in an editing-amount increasing time period and calculates the area of overlap of the rectangle for the editing-amount increasing time period and each single object. The object-tag-information calculating unit 443 calculates information on the tag of each object edited in the editing-amount increasing time period.

The inter-editing-amount-increasing-time-period difference extracting unit 4412 performs a process by using the calculation result obtained by the rectangle calculating unit 442 or the object-tag-information calculating unit 443.

Figure 8:
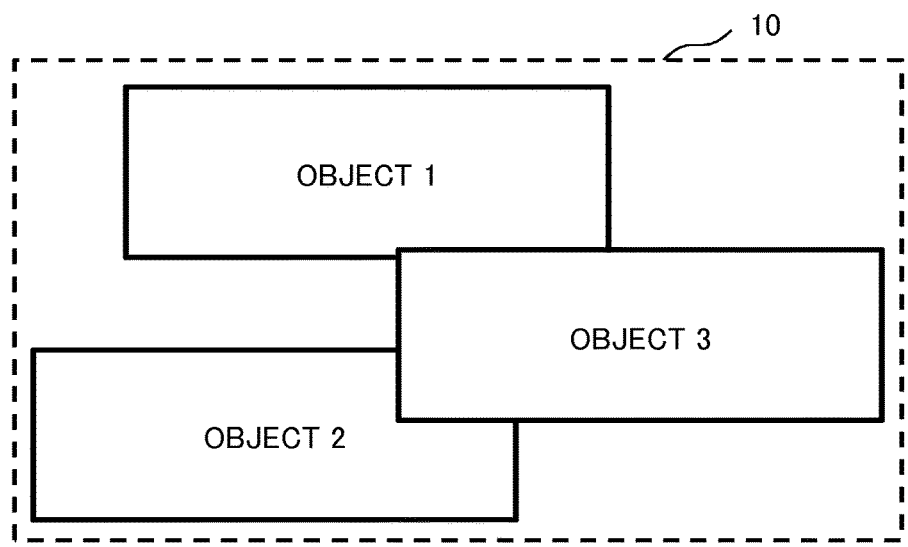
FIG. 8 is a schematic diagram for illustrating a rectangle for an editing-amount increasing time period, the rectangle being used in the information display processing system according to the first exemplary embodiment of the present invention.

FIG. 8 illustrates an example of the rectangle for the editing-amount increasing time period. As illustrated in FIG. 8, the rectangle for the editing-amount increasing time period (rectangle 10) is defined so as to surround at least one object edited in the editing-amount increasing time period. A rectangle in an editing-amount increasing time period may be defined so as to be in contact with the periphery of the objects or may be defined so as to have a certain distance from the objects. In the case where multiple objects are managed as a set of objects, a rectangle is defined so as to surround the multiple objects constituting the object set as illustrated in FIG. 8.

Description is given above of a request which the display device 3 issues to the management device 2 in the processing in the information display processing system 1 according to this exemplary embodiment of the present invention.

(Operation)

Next, operation of the information display processing system 1 according to this exemplary embodiment is described with reference to the drawings.

First, for the purpose of comparison, description is given of a general online whiteboard (referred to also as whiteboard below). In a general whiteboard, a display device creates a whiteboard, and settings for a tag indicating the theme of the whiteboard and a tag indicating the content of the whiteboard are made. Such a general whiteboard includes a unit which adds or modifies an object on the whiteboard. A management device of such a general whiteboard stores data on multiple whiteboards, data on the objects included in each whiteboard, and data (history data) on past objects, in association with the update times and dates and information on the update users.

Next, description is given of the operation in the information display processing system 1 according to this exemplary embodiment for extracting each point at which a discussion is carried out on a whiteboard and each point at which a record is to be kept, on the basis of editing amounts. It is assumed that online whiteboards managed in the information display processing system 1 according to this exemplary embodiment have the same features as above-described features of a general online whiteboard.

In the information display processing system 1 according to this exemplary embodiment, first, the display device 3 issues an editing-amount display request regarding the theme of target whiteboards to the management device 2. In the editing-amount display request, a period for which editing amounts are desired to be displayed is specified as a particular period. In response to the editing-amount display request from the display device 3, the management device 2 identifies time periods each having a large editing amount for the theme of the target whiteboards, as editing-amount increasing time periods. The management device 2 returns an editing-amount graph presenting the identified editing-amount increasing time periods to the display device 3.

When the display device 3 displays the editing-amount graphs of the target whiteboards, at least one of the editing-amount increasing time periods is specified for display such as difference display. When at least one editing-amount increasing time period is specified, the display device 3 issues a difference display request to the management device 2. In response to the difference display request, the management device 2 extracts object data of each object edited in the desired time period on the basis of the target editing-amount increasing time period and returns the extracted object data to the display device 3. The display device 3 displays the difference of the objects edited in the desired time period.

An editing-amount display request and a difference display request are described below in detail.

(Editing-Amount Display Request)

Figure 9:
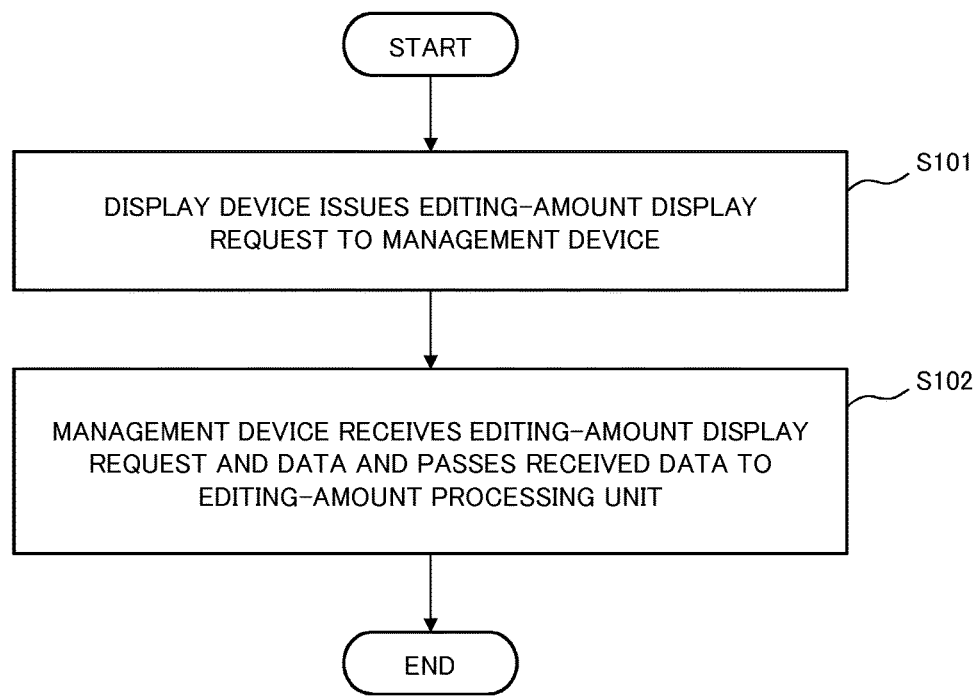
FIG. 9 is a flowchart presenting an overview of operations by a display device and the management device when an editing-amount display request is made in the information display processing system according to the first exemplary embodiment of the present invention.

First, description is given of initial operation when the management device 2 receives an editing-amount display request from the display device 3, with reference to the flowchart in FIG. 9.

In the event of issuing an editing-amount display request, the tag indicating the theme of whiteboards and a particular period are specified on the display unit 60 of the display device 3.

In FIG. 9, first, the display unit 60 issues an editing-amount display request via the data transmitting/receiving unit 50 and passes the specified data (the tag indicating the theme of whiteboards and the particular period) to the management device 2 (Step S101).

The data transmitting/receiving unit 30 of the management device 2 receives the editing-amount display request and the data. In the management device 2, the data transmitting/receiving unit 30 passes the received editing-amount display request and data to the editing-amount processing unit 43 (Step S102).

The editing-amount processing unit 43 includes a unit which defines an editing amount and has the function of carrying out processing while using editing amounts defined variously. For example, the editing-amount processing unit 43 defines an object editing amount on the basis of the number of times an object has been added or modified (Equation 1) or the size of added or modified objects (Equation 2). The size of objects corresponds to the size or the area of the objects on the whiteboard.

(Editing amount)=(number of addition/modification times)     (1)

(Editing amount)=(addition/modification size)     (2)

An object editing amount may be defined on the basis of the size of added or modified data, the length of processing time required for addition/modification, or the level of importance of the process, instead of the number of times an object has been added or modified or the size of objects.

Description is given above of the initial operation when the management device 2 receives an editing-amount display request from the display device 3.

Description is given below of operation of the editing-amount processing unit 43 when an editing-amount display request is issued in the case where an object editing amount is defined as the number of times an object has been edited, with reference to the flowchart in FIG. 10.

Figure 10:
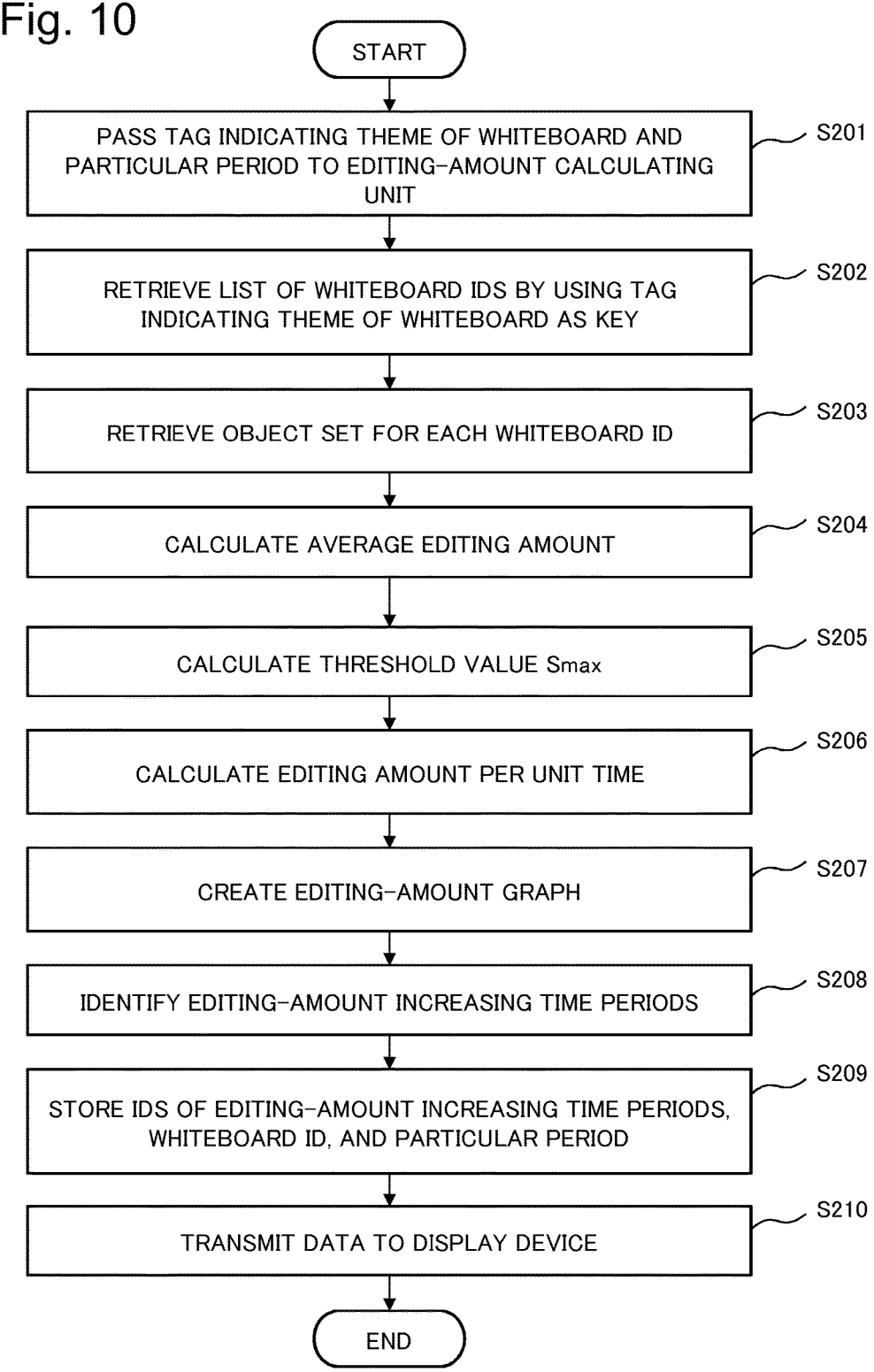
FIG. 10 is a flowchart presenting operations of the management device when an editing-amount display request is made in the information display processing system according to the first exemplary embodiment of the present invention.

In FIG. 10, first, the editing-amount processing unit 43 passes data including the tag indicating the theme of whiteboards and a particular period to the editing-amount calculating unit 431 (Step S201).

By using the tag indicating the theme of whiteboards as a key, the editing-amount calculating unit 431 retrieves the list of IDs of the whiteboards having the specified tag, from the whiteboard data storing unit 22 (Step S202).

After retrieving the list of the whiteboard IDs, the editing-amount calculating unit 431 carries out the following processing for each whiteboard ID.

First, the editing-amount calculating unit 431 retrieves an object set of each whiteboard ID from the object data storing unit 23 with reference to the addition times and dates and the update times and dates in the particular period (Step S203). In this step, the editing-amount calculating unit 431 carries out the operation in Step S203 for each of all the whiteboards in the list.

The editing-amount calculating unit 431 calculates the total number of objects in the object set retrieved from the object data storing unit 23. The editing-amount calculating unit 431 calculates the average editing amount by dividing the calculated total number of objects by the number of unit times corresponding to the particular period (Step S204).

After calculating the average editing amount, the editing-amount calculating unit 431 carries out processing for identifying time periods each having a large editing amount. In this process, the editing-amount calculating unit 431 calculates the threshold value Smax on the basis of the average editing amount, in order to identify time periods each having a large editing amount (Step S205). For example, the threshold value Smax may be defined as the numerical value equal to twice the value of the average editing amount. Alternatively, the threshold value Smax may be defined as the numerical value equal to any multiple of the average editing amount, for example. The numerical value of the threshold value Smax may be set as desired and may be set on the basis of a factor different from the average editing amount.

Then, the editing-amount calculating unit 431 calculates the editing amount per unit time for the object set of each whiteboard retrieved in Step S202, in order to identify time periods each having a large editing amount (Step S206). For example, in the case where the unit time is set to be one day, the editing-amount calculating unit 431 counts the number of objects on a daily basis with reference to the addition times and dates and update times and dates related to the object set. The unit time may be set to have any time range, for example, several minutes, several hours, or several days.

Thereafter, the editing-amount calculating unit 431 creates an editing-amount graph representing the transition of the editing amount per unit time with time (Step S207). In the case where an editing amount is defined as the number of times an object has been added or modified, the number of objects counted in the example in Step S206 corresponds to the editing amount per unit time. Accordingly, the editing-amount calculating unit 431 obtains a histogram created by plotting the counted number of objects as the editing amount against time.

Then, the editing-amount calculating unit 431 searches for time periods each having an editing amount exceeding the threshold value Smax and identifies each of the obtained time periods as an editing-amount increasing time period (Step S208). When the editing amount exceeds the threshold value Smax over multiple successive time periods, the successive time periods are considered as a single editing-amount increasing time period.

Figure 11:
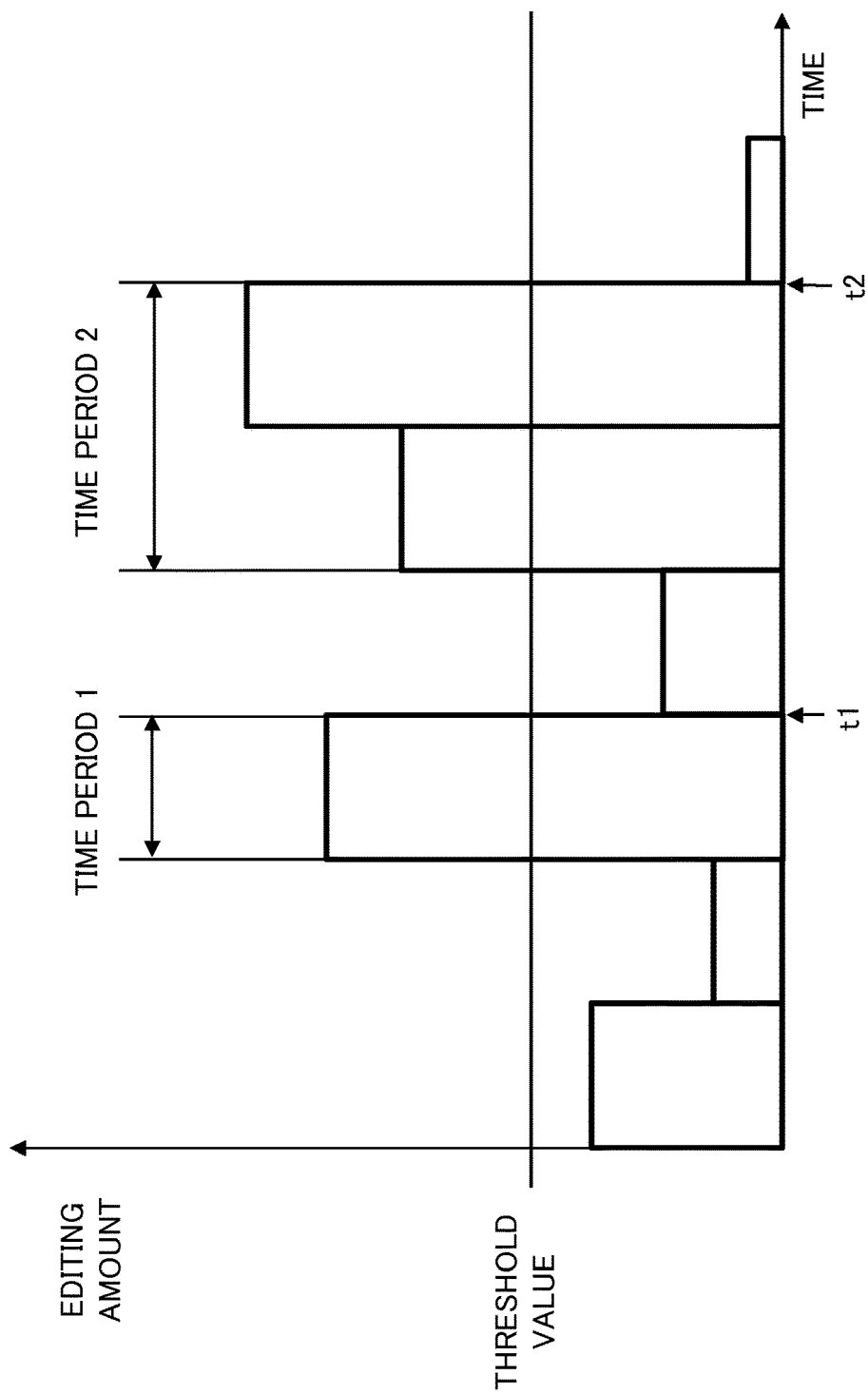
FIG. 11 is a schematic diagram illustrating an example of an editing-amount graph used in the information display processing system according to the first exemplary embodiment of the present invention.

FIG. 11 presents an example of a graph representing the editing amount per unit time. In FIG. 11, the horizontal axis represents time, and the vertical axis represents the editing amount per unit time. A threshold value of the editing amount per unit time is also indicated in FIG. 11. In FIG. 11, the editing amount per unit time exceeds the threshold value in a time period 1 and a time period 2. Accordingly, the editing-amount calculating unit 431 identifies each of the time period 1 and the time period 2 as an editing-amount increasing time period. The time period 2 is an example of a time period in which an editing amount exceeds the threshold value over multiple successive time periods. In the following description, the time period between the time period 1 and the time period 2 is referred to as an inter-editing-amount-increasing-time-period unless otherwise stated. Specifically, an inter-editing-amount-increasing-time-period corresponds to the time period between a time point t1 and a time point t2 in FIG. 11. The time point t1 and the time point t2 correspond to the latest time points in the time period 1 and the time period 2, respectively.

When editing-amount increasing time periods are identified, the editing-amount processing unit 43 assigns an ID to each of the editing-amount increasing time periods. The editing-amount processing unit 43 stores the IDs of the editing-amount increasing time periods, the whiteboard ID, the particular period, and the data on the editing-amount graph, in the editing-amount storing unit 432 (Step S209).

Then, the editing-amount processing unit 43 transmits the IDs of the editing-amount increasing time periods, the whiteboard ID, and the data on the editing-amount graph to the display device 3 via the data transmitting/receiving unit 30 (Step S210). The data on the editing-amount graph is a graph representing editing-amount increasing time periods on a time axis, for each whiteboard. The editing-amount graph may be created in the management device 2 or the display device 3 on the basis of the data on the editing-amount graph stored in the editing-amount storing unit 432.

Upon receipt of the data from the management device 2, the display device 3 displays the editing-amount graph for each whiteboard.

Figure 12:
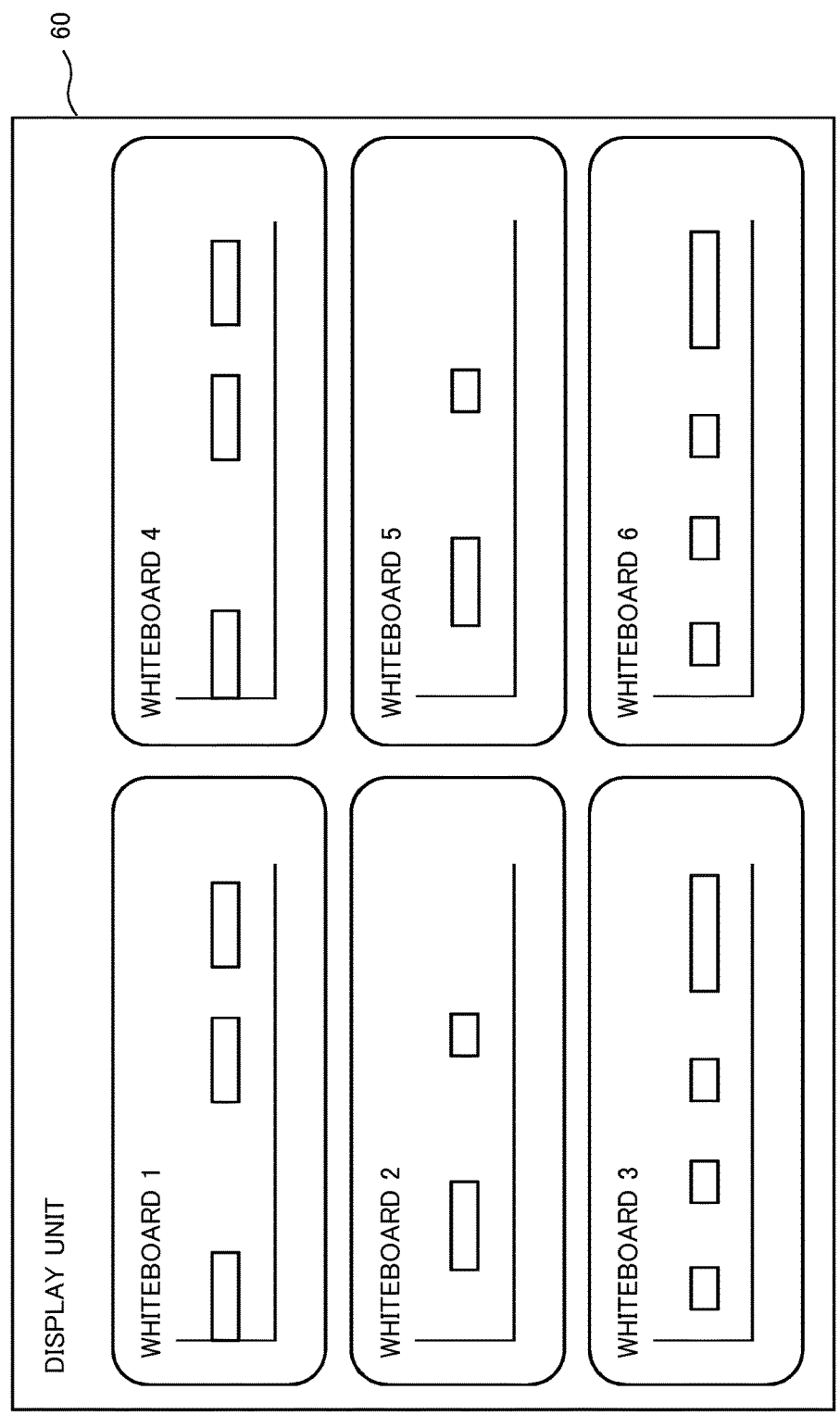
FIG. 12 is a schematic diagram illustrating an example of a screen display displayed by a display unit of the display device included in the information display processing system according to the first exemplary embodiment of the present invention.

FIG. 12 presents an example of editing-amount graphs displayed by the display device 3 as a result of the processing in FIG. 10. In the example in FIG. 12, six graphs are presented each having time on the horizontal axis. In each of the six graphs in FIG. 12, each time period having an editing amount exceeding the threshold value on the corresponding whiteboard is presented in a strip shape. An editing-amount increasing time period is a time period in which an object has been added or modified many times, that is, a time period in which a discussion or a work operation has been carried out. Accordingly, a user can specify a time period in which an object has been added or modified many times, by selecting an editing-amount increasing time period with reference to the display as that in FIG. 12.

In contrast, in the case where an editing amount is defined using the size (area) of added or edited objects, the processing is different from the case where an editing amount is defined as the number of addition/editing times described using FIG. 10, in terms of Steps S204 and S206. When the area of the added or edited objects is used as an editing amount, the total area of the added or modified objects is calculated instead of calculating the total number of objects, in Step S204 in FIG. 10. In Step S206 in FIG. 10, the editing amount per unit time is calculated on the basis of the total area of the added or modified objects.

Description is given above of the operation of the management device 2 in the operation when an editing-amount display request is issued.

(Difference Display)

Description is given below of displays (difference displays) carried out by the display unit 60.

The display unit 60 of the display device 3 is capable of displaying editing-amount increasing time periods for each whiteboard as illustrated in FIG. 12. With reference to the display in FIG. 12, difference display is specified from the following kinds: "displaying whiteboard data updated prior to a selected editing-amount increasing time period", "highlighting objects updated in a selected editing-amount increasing time period", or "displaying difference between two selected editing-amount increasing time periods". Description is given below of each kind of the difference display.

[Pre-Editing-Amount-Increasing-Time-Period Difference Display]

The first difference display is pre-editing-amount-increasing-time-period difference display in which whiteboard data updated before a selected editing-amount increasing time period is displayed. In the pre-editing-amount-increasing-time-period difference display, the display device 3 passes the ID of a selected editing-amount increasing time period to the management device 2.

The management device 2 receives data including the ID of the editing-amount increasing time period at the data transmitting/receiving unit 30 and issues a request to the difference processing unit 44. When issuing the request to the difference processing unit 44, the management device 2 passes data including the ID of the editing-amount increasing time period together with the request to the difference processing unit 44.

Upon receipt of the request, the difference processing unit 44 passes the received data to the pre-editing-amount-increasing-time-period difference extracting unit 4413 of the difference extracting unit 441. The pre-editing-amount-increasing-time-period difference extracting unit 4413 passes the received data to the editing-amount processing unit 43.

The editing-amount processing unit 43 retrieves data including the whiteboard ID and the particular period stored in the editing-amount storing unit 432, by using, as a key, the ID of the editing-amount increasing time period included in the received data. The editing-amount processing unit 43 returns the retrieved data to the pre-editing-amount-increasing-time-period difference extracting unit 4413.

The pre-editing-amount-increasing-time-period difference extracting unit 4413 retrieves the latest version of the object data of each object added or modified before the latest time point (e.g., the time point t1 or t2 in FIG. 11) in the editing-amount increasing time period, from the object data storing unit 23. The pre-editing-amount-increasing-time-period difference extracting unit 4413 retrieves the target object data from the object data storing unit 23 by using the addition times and dates and the update times and dates as a key.

The difference processing unit 44 passes the retrieved object data to the data transmitting/receiving unit 30. The data transmission from the data storing unit 20 to the data transmitting/receiving unit 30 may be performed directly by the data storing unit 20 instead of the difference processing unit 44.

The data transmitting/receiving unit 30 returns the received object data to the display device 3. The display device 3 displays the received object data. In this event, the display device 3 displays the object data prior to the latest time point in the editing-amount increasing time period.

The pre-editing-amount-increasing-time-period difference display is described above.

[Editing-Amount-Increasing-Time-Period Difference Display]

The second difference display is editing-amount-increasing-time-period difference display in which objects updated in a selected editing-amount increasing time period are highlighted. In the editing-amount-increasing-time-period difference display, the display device 3 passes the ID of the selected editing-amount increasing time period to the management device 2.

The management device 2 receives data including the ID of the editing-amount increasing time period at the data transmitting/receiving unit 30 and issues a request to the difference processing unit 44. When issuing the request to the difference processing unit 44, the management device 2 passes the data including the ID of the editing-amount increasing time period together with the request to the difference processing unit 44.

Upon receipt of the request, the difference processing unit 44 passes the received data to the editing-amount-increasing-time-period difference extracting unit 4411 of the difference extracting unit 441. The editing-amount-increasing-time-period difference extracting unit 4411 passes the received data to the editing-amount processing unit 43.

The editing-amount processing unit 43 retrieves data including the whiteboard ID and the particular period stored in the editing-amount storing unit 432, by using, as a key, the ID of the editing-amount increasing time period included in the received data. The editing-amount processing unit 43 returns the retrieved data to the editing-amount-increasing-time-period difference extracting unit 4411.

The editing-amount-increasing-time-period difference extracting unit 4411 retrieves the latest version of the object data of each object added or modified by the latest time point in the editing-amount increasing time period, from the object data storing unit 23.

The editing-amount-increasing-time-period difference extracting unit 4411 marks object data of each object added or modified in the editing-amount increasing time period in the retrieved data, so as to highlight the object data. The marking may be set using an identifier or flag information for differentiating each object to be highlighted from the other objects.

The difference processing unit 44 passes the marked data to the data transmitting/receiving unit 30.

The data transmitting/receiving unit 30 returns the received data to the display device 3. The display device 3 highlights the marked data of the received object data. In this event, the display device 3 displays the object data edited in the editing-amount increasing time period.

Figure 13:
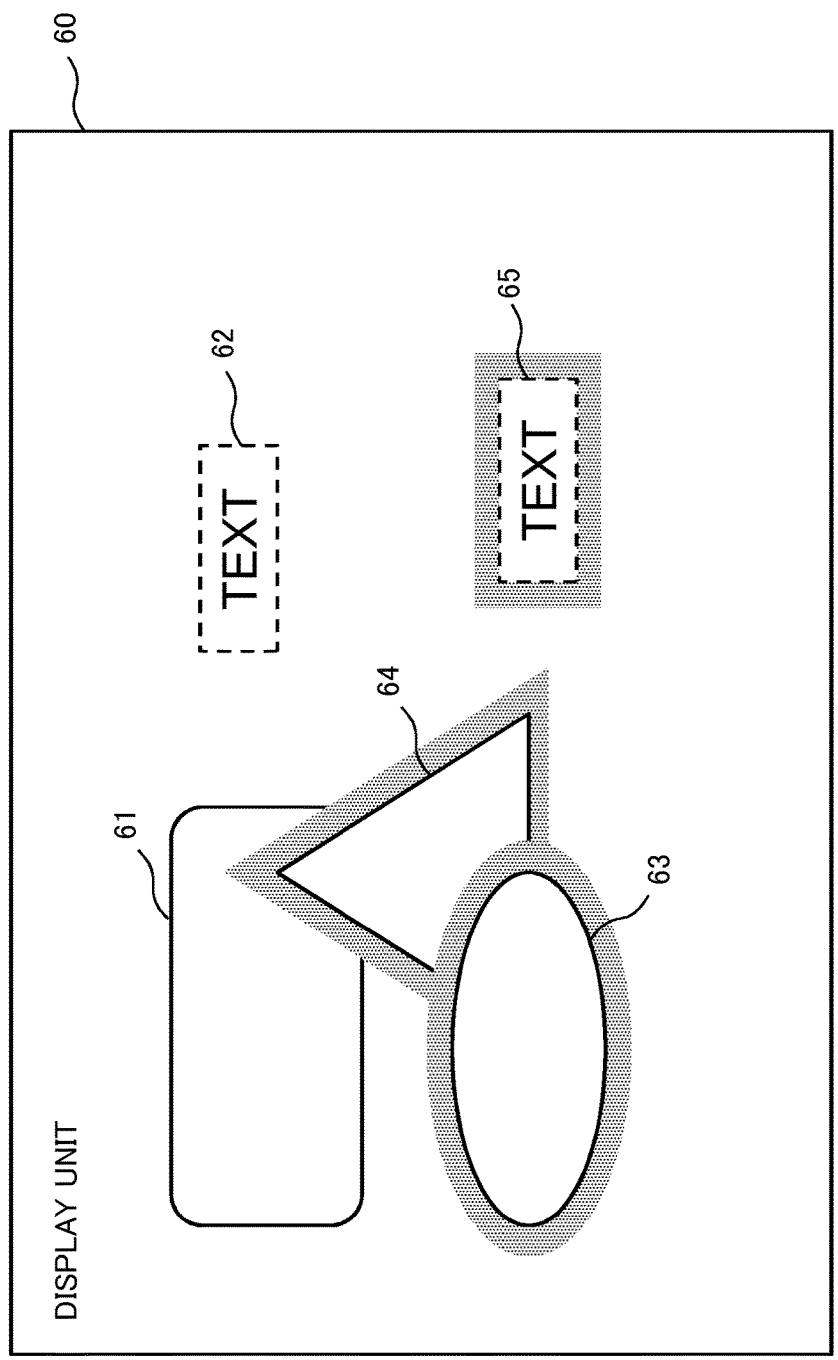
FIG. 13 is a schematic diagram illustrating an example in which objects subjected to difference display are highlighted by the display device included in the information display processing system according to the first exemplary embodiment of the present invention.

FIG. 13 illustrates an example in which each object for difference display is highlighted by shading the circumference of the object. In the example of display in FIG. 13, a figure object 63, a figure object 64, and a text object 65 are highlighted, and a figure object 61 and a text object 62 are not highlighted. Although each text object is surrounded by broken lines in FIG. 13, only the text (character information) is displayed in an actual whiteboard.

For example, in order to highlight an object for difference display, the edge or the circumference of the target object may be highlighted with a line thicker than others or by shading. When color display is possible, the display device 3 may display objects to be highlighted, in a color which is more prominent than that used for those not to be highlighted.

The editing-amount-increasing-time-period difference display is described above.

[Inter-Editing-Amount-Increasing-Time-Period Difference Display]

The third difference display is inter-editing-amount-increasing-time-period difference display in which the difference between two selected editing-amount increasing time periods is displayed. In the inter-editing-amount-increasing-time-period difference display, the display device 3 passes the IDs of two selected editing-amount increasing time periods to the management device 2.

The management device 2 receives the data including the IDs of the two editing-amount increasing time periods at the data transmitting/receiving unit 30 and issues a request to the difference processing unit 44. When issuing the request to the difference processing unit 44, the management device 2 passes the data including the IDs of the two editing-amount increasing time periods together with the request to the difference processing unit 44.

Upon receipt of the request, the difference processing unit 44 passes the data to the inter-editing-amount-increasing-time-period difference extracting unit 4412. The difference processing unit 44 passes the data also to the editing-amount processing unit 43.

The editing-amount processing unit 43 retrieves data including the whiteboard ID and the particular period stored in the editing-amount storing unit 432, by using the IDs of the two editing-amount increasing time periods as a key. The editing-amount processing unit 43 returns the retrieved data to the inter-editing-amount-increasing-time-period difference extracting unit 4412.

The inter-editing-amount-increasing-time-period difference extracting unit 4412 retrieves the latest version of the object data of the objects added or modified before the newer one of the editing-amount increasing time period in terms of time, from the object data storing unit 23. The inter-editing-amount-increasing-time-period difference extracting unit 4412 retrieves the object data from the object data storing unit 23 by using the whiteboard ID, the addition times and dates, and update times and dates as a key. The inter-editing-amount-increasing-time-period difference extracting unit 4412 marks the objects added or modified in the period between the latest time points of the two editing-amount increasing time periods in the retrieved object set, so as to highlight the objects.

Then, the difference processing unit 44 passes the marked data to the data transmitting/receiving unit 30. The data transmitting/receiving unit 30 returns the received data to the display device 3.

The display device 3 highlights the marked data of the received object data. In this event, the display device 3 displays the difference of the object data edited in the two editing-amount increasing time periods.

The inter-editing-amount-increasing-time-period difference display is described above.

(Determination about Objects Between Editing-Amount Increasing Time Periods)

Operation for displaying the difference between editing-amount increasing time periods is as described above. In the above-described operation, when displaying the difference, objects are highlighted on the assumption that the update of each object between the two editing-amount increasing time periods is included in the newer one of the editing-amount increasing time periods in terms of time. In some cases, however, it is more effective for the difference to determine which time period is to include the update of each object edited between the two editing-amount increasing time periods. Description is given below of an example of determining which one of two editing-amount increasing time periods is to include each update performed between the two time periods, with reference to the flowcharts in FIGS. 14 and 15.

Each editing-amount increasing time period has a time range corresponding to a certain length or longer. Accordingly, first, the inter-editing-amount-increasing-time-period difference extracting unit 4412 carries out processing for retrieving the data on each object updated in each target editing-amount increasing time period, from the object data storing unit 23. In this process, data on each of the two editing-amount increasing time periods is retrieved.

Figure 14:
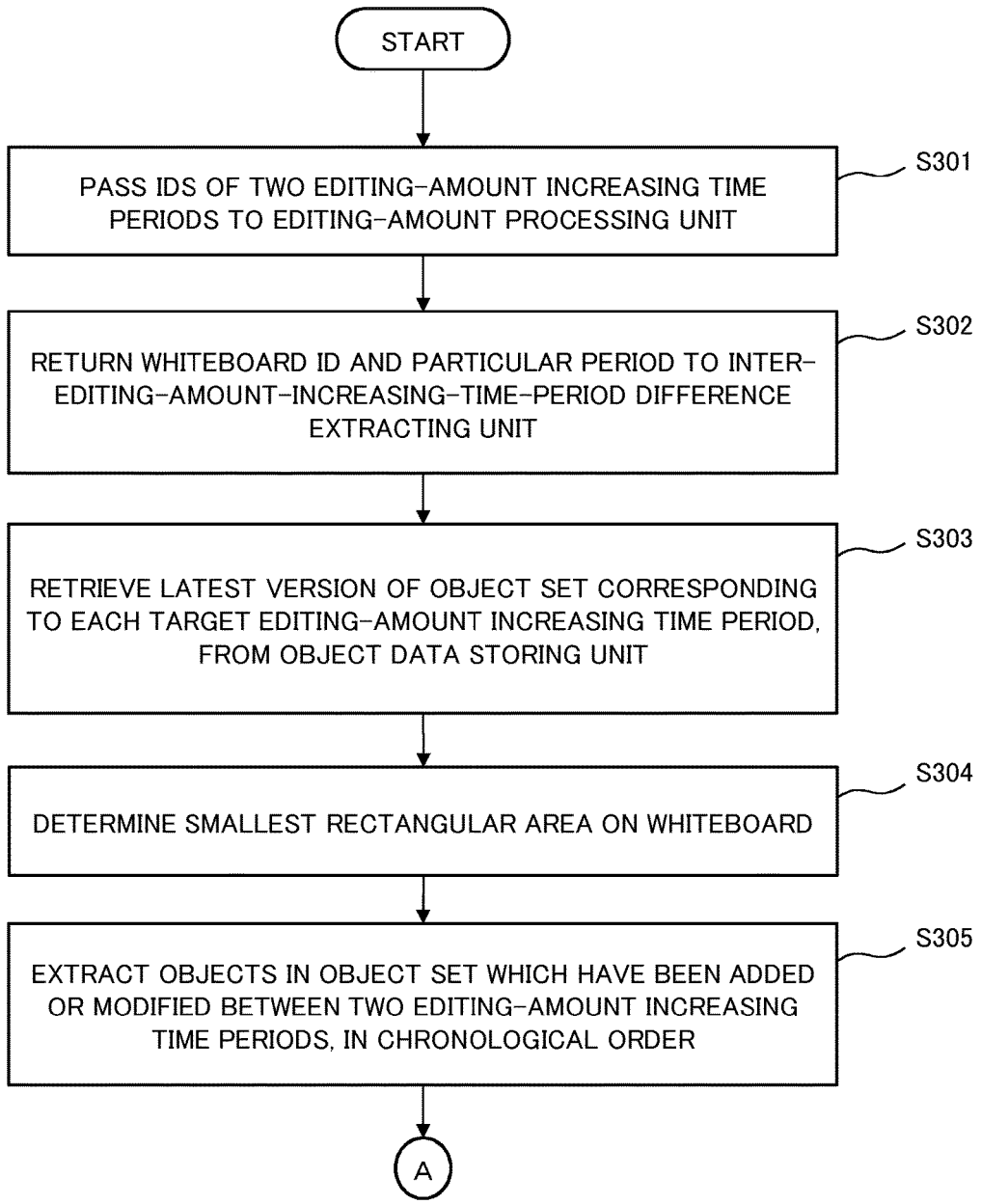
FIG. 14 is a flowchart presenting a procedure for determining which one of two editing-amount increasing time periods is a time period in which each object added or modified between the two editing-amount increasing time periods has been edited, in the information display processing system according to the first exemplary embodiment of the present invention.

Then, in FIG. 14, the inter-editing-amount-increasing-time-period difference extracting unit 4412 passes the received IDs of the two editing-amount increasing time periods to the editing-amount processing unit 43 (Step S301).

The editing-amount processing unit 43 retrieves the data including the whiteboard ID and the particular period stored in the editing-amount storing unit 432. The editing-amount processing unit 43 returns the retrieved data to the inter-editing-amount-increasing-time-period difference extracting unit 4412 (Step S302).

On the basis of the data retrieved by the editing-amount processing unit 43, the whiteboard ID and the time range of each editing-amount increasing time period are obtained. The inter-editing-amount-increasing-time-period difference extracting unit 4412 retrieves the newest version of the object set in each target editing-amount increasing time period from the object data storing unit 23 by using the whiteboard ID, the addition times and dates, and the update times and dates as a key (Step S303). The inter-editing-amount-increasing-time-period difference extracting unit 4412 passes the extracted object set to the rectangle calculating unit 442.

The rectangle calculating unit 442 checks the position and the size of each object from the data on the objects edited in each editing-amount increasing time period and determines the smallest rectangular area (the rectangle for the editing-amount increasing time period) covering the object set on the whiteboard (Step S304). The smallest rectangular area is defined by the points at which the coordinate of the objects included in the object set is the maximum and the minimum for each of the horizontal axis and the vertical axis on the whiteboard.

Then, the inter-editing-amount-increasing-time-period difference extracting unit 4412 extracts the objects added or modified between the two editing-amount increasing time periods, in chronological order. In the retrieval, the inter-editing-amount-increasing-time-period difference extracting unit 4412 extracts the objects from the object data storing unit 23 in chronological order by using the whiteboard ID, the addition dates and times, and the update dates and times as a key (Step S305). After Step S305 in FIG. 14, the processing advances to Step S311 in FIG. 15.

Figure 15:
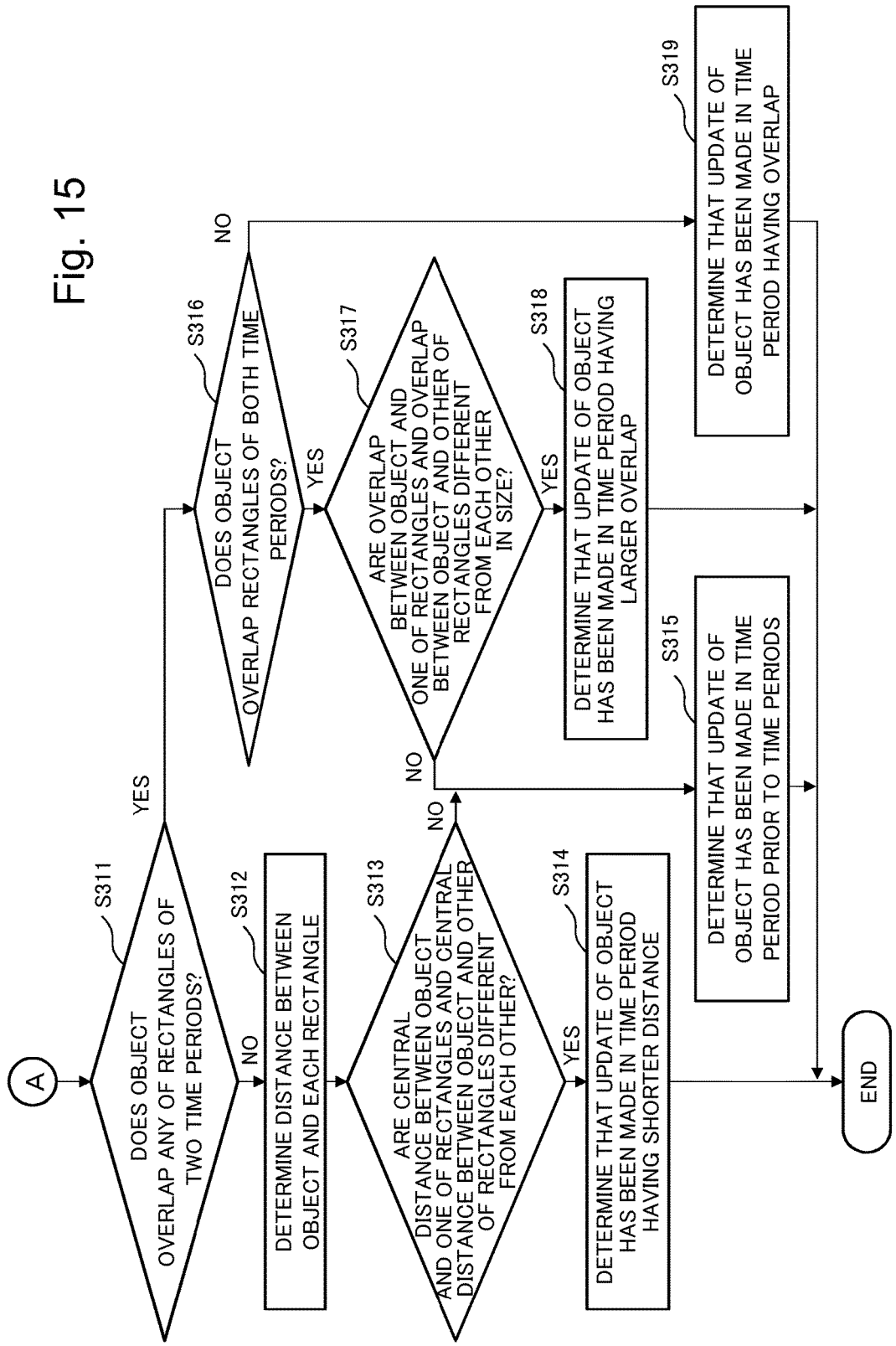
FIG. 15 is a flowchart presenting the procedure for determining which one of two editing-amount increasing time periods is a time period in which each object added or modified between the two editing-amount increasing time periods has been edited, in the information display processing system according to the first exemplary embodiment of the present invention.

In FIG. 15, the inter-editing-amount-increasing-time-period difference extracting unit 4412 determines whether each of the objects retrieved in chronological order overlaps the rectangles of the two editing-amount increasing time periods on the whiteboard (Step S311).

First, description is given of the case in which an object of those retrieved in chronological order overlaps neither of the rectangles of the two editing-amount increasing time periods (No in Step S311). In this case (No in Step S311), the inter-editing-amount-increasing-time-period difference extracting unit 4412 determines, for each of the two editing-amount increasing time periods, the shortest distance between the central position of the retrieved object and the central position of the rectangle for the editing-amount increasing time period (Step S312).

The shortest distance (referred to as object-rectangle distance below) between the central position of the retrieved object and the central position of the rectangle for the editing-amount increasing time period may be defined as the length of a line segment joining the defined central positions.

For example, when the central position is defined as the center of gravity of a figure, the shortest distance may be determined as the distance between the centers of gravity of the respective figures. Note that the method of determining the shortest distance is not limited to the above.

The inter-editing-amount-increasing-time-period difference extracting unit 4412 determines whether the shortest object-rectangle distances of the two editing-amount increasing time periods are different from each other (Step S313).

When the object-rectangle distances of the two editing-amounts increasing time periods are different from each other (Yes in Step S313), the inter-editing-amount-increasing-time-period difference extracting unit 4412 determines that the object is in the editing-amount increasing time period having the smaller distance. In other words, the inter-editing-amount-increasing-time-period difference extracting unit 4412 determines that the target object has been updated in the time period having the smaller object-rectangle distance (Step S314).

When the object-rectangle distances of the two editing-amounts increasing time periods are the same (No in Step S313), the inter-editing-amount-increasing-time-period difference extracting unit 4412 determines that the object has been updated in a time period prior to the time periods (Step S315).

In contrast, when the retrieved object overlaps the rectangles extracted for the two time periods (Yes in Step S311), the inter-editing-amount-increasing-time-period difference extracting unit 4412 determines whether the object overlaps the rectangles of both of the time periods (Step S316).

When the object overlaps the rectangles of both of the time periods (Yes in Step S316), the inter-editing-amount-increasing-time-period difference extracting unit 4412 determines whether the overlap between the retrieved object and one of the rectangles of the two time periods and the overlap between the retrieved object and the other rectangle are different from each other in size (Step S317).

When the overlap between the retrieved object and one of the rectangles of the two time periods and the overlap between the retrieved object and the other rectangle are different from each other in size (Yes in Step S317), the inter-editing-amount-increasing-time-period difference extracting unit 4412 determines that the object is in the time period having the larger overlap. In other words, the inter-editing-amount-increasing-time-period difference extracting unit 4412 determines that the object has been updated in the time period having the larger overlap (Step S318).

When the overlap between the retrieved object and one of the rectangles of the two time periods and the overlap between the retrieved object and the other rectangle are the same in size (No in Step S317), the inter-editing-amount-increasing-time-period difference extracting unit 4412 determines that the object has been updated in a time period prior to the time periods (Step S315).

When the retrieved object overlaps the rectangle of only one of the editing-amount increasing time period (No in Step S316), the inter-editing-amount-increasing-time-period difference extracting unit 4412 determines that the object is included in the time period having the overlap. In other words, the inter-editing-amount-increasing-time-period difference extracting unit 4412 determines that the object has been updated in the time period having the overlap (Step S319).

On the basis of the above determination result, the difference processing unit 44 transmits the object set including the objects edited between the editing-amount increasing time periods to the display device 3. When the display device 3 displays the received object set, the objects edited between the two editing-amount increasing time periods are displayed on the whiteboard.

By the use of the above-described method presented in FIGS. 14 and 15, it is possible to appropriately determine which one of the two editing-amount increasing time periods is to include addition/modification of each object made in the two time periods, consequently facilitating the display of the difference between the editing-amount increasing time periods.

Figure 16:
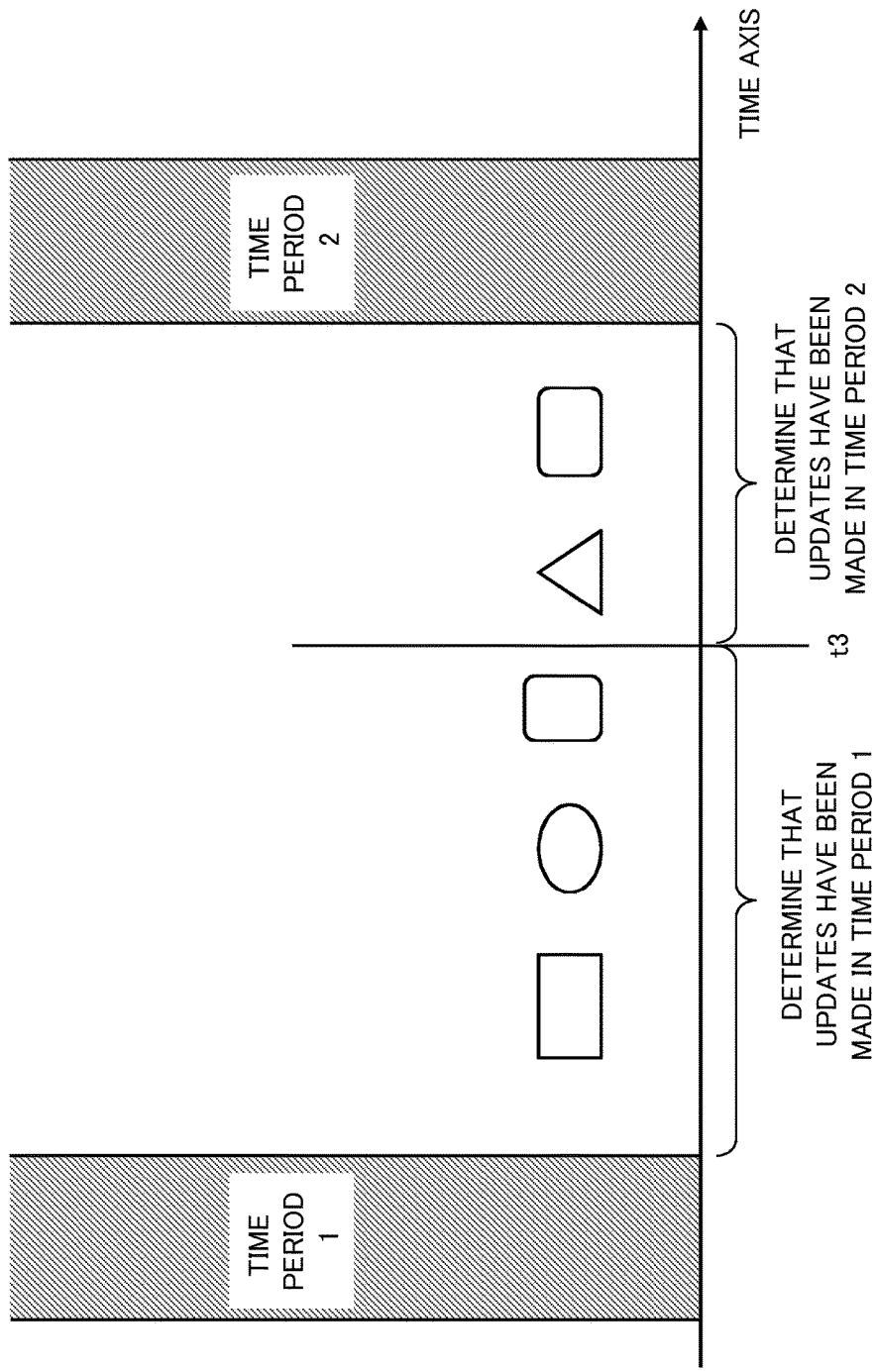
FIG. 16 is a schematic diagram illustrating an example of determining which one of two editing-amount increasing time periods is a time period in which each object added or modified between the two editing-amount increasing time periods has been edited, on a whiteboard in the information display processing system according to the first exemplary embodiment of the present invention.

FIG. 16 presents an example illustrating a way of determining, in the case where objects have been updated between two editing-amount increasing time periods, i.e., a time period 1 and a time period 2, which one of the two time periods is to include the update made between the two time periods. In the example in FIG. 16, it is determined that the objects updated before a time point t3 are included in the time period 1 and that the objects updated after the time point t3 are included in the time period 2, among the objects updated between the time period 1 and the time period 2. The time point t3 may be set as desired.

Description is given below of a method of determining which one of two editing-amount increasing time periods is more suitable to include an update made between the two time periods, on the basis of a concrete example with reference to FIGS. 17 and 18.

FIG. 17 presents an example of a table 100 storing, for each of multiple objects to which respective object IDs 1 to 9 are assigned, the position on a whiteboard, the size, and the update time and date. In the example in FIG. 17, it is assumed that the time period in which the update date is December 1 is determined to be an editing-amount increasing time period 1 (time period 1 below) and that the time period in which the update date is December 9 is determined to be an editing-amount increasing time period 2 (time period 2). FIG. 18 presents an example of displaying rectangles (in solid lines) including respective objects stored in the table 100 in FIG. 17, on the whiteboard. Each rectangle including an object (object rectangle, below) is set to include an object in any shape therein. The number presented in each object rectangle (in solid lines) in FIG. 18 corresponds to the object ID in the table 100 in FIG. 17. In the following description, the object having 1 as an object ID, the object having 2 as an object ID, . . . , and the object having n as an object ID are referred to as object 1, object 2, . . . , and object n, respectively (where n is a natural number).

Figure 18:
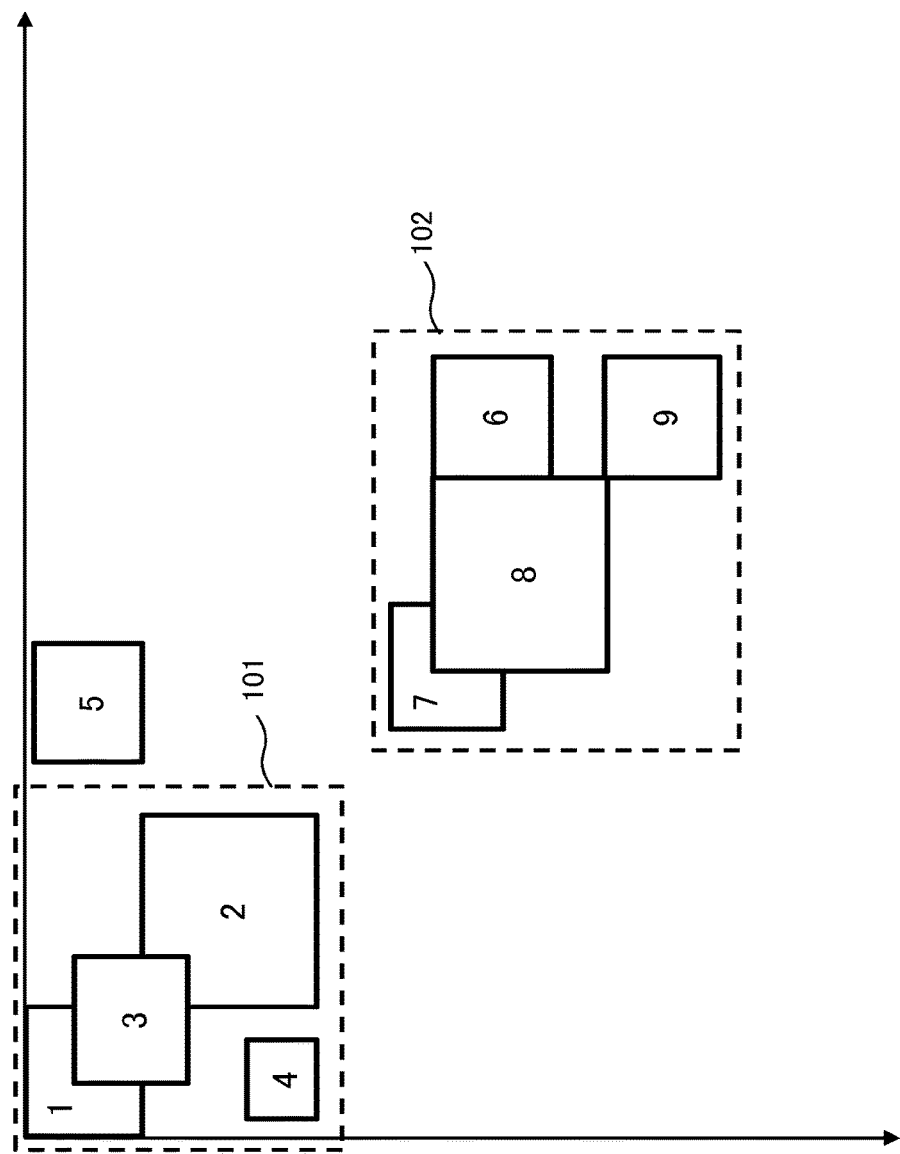
FIG. 18 is a schematic diagram illustrating an example of objects added or modified on a whiteboard in the information display processing system according to the first exemplary embodiment of the present invention.

In FIG. 18, the objects included in the time period 1 are objects 1 to 3, and the rectangle of the time period 1 is a part (rectangle 101) illustrated in broken lines at the upper left in the diagram. In FIG. 18, the objects included in the time period 2 are objects 7 to 9, and the rectangle of the time period 2 is a part (rectangle 102) illustrated in broken lines at the lower right in the diagram.

In FIG. 18, the object rectangles (in solid lines) included in the rectangle (in broken lines) of each time period and the rectangle (in broken lines) of the time period are illustrated with a distance there between. The rectangle (in broken lines) of each time period may be defined so as to be along the sides located outermost among the sides of the multiple object rectangles (in solid lines) included in the rectangle (in broken lines) of the time period. Alternatively, the rectangle (in broken lines) of each time period may be defined so as to have a predetermined distance from the sides located outermost among the sides of the multiple object rectangles (in solid lines) included in the rectangle (in broken lines) of the time period.

For each of the objects 4 to 6 updated between the two time periods, it is determined which one of the two time periods is to include the object in chronological order.

Since the object 4 overlaps only the rectangle of the time period 1, the update of the object 4 is determined to be in the time period 1. Since the object 5 is closer to the rectangle of the time period 1 than that of the time period 2 although being included in neither of the rectangles, the update of the object 5 is determined to be in the time period 1. Since the object 6 overlaps only the rectangle of the time period 2, the update of the object 6 is determined to be in the time period 2.

Description is given above of the method of determining which one of two editing-amount increasing time periods is more suitable to include an update made between the two time periods.

As described above, with the information display processing system according to this exemplary embodiment, it is possible to identify editing-amount increasing time periods, each of which has a large object editing amount, in an online whiteboard. This makes it possible to display the whiteboard in a desired state on the basis of the identified editing-amount increasing time periods. In particular, the information display processing system according to this exemplary embodiment promotes the efficiency of difference display for objects edited between editing-amount increasing time periods.

In the case of browsing a whiteboard in an update state prior to the time period in which a discussion or a work operation has been carried out or the case of displaying the difference between discussions or work operations, general online whiteboards have difficulty in identifying a time period in which a discussion or a work operation has been carried out. Because of this, it is difficult for a user to determine the time period for which the difference is to be displayed. Moreover, even when the time period in which a discussion or a work operation has been performed is identified, it is difficult to determine, for difference display, which is more effective to include the update of an object made between the time periods, between the time periods of the discussion or the work operation. The information display processing system according to this exemplary embodiment can solve the above problems of general online whiteboards.

The processing in the information display processing system according to this exemplary embodiment is briefly summarized below. In the following summary, the numerals of the constituent elements are omitted.

In an online whiteboard, addition or update of an object on the whiteboard tends to be frequently made per unit time in a time period in which a discussion or a work operation is carried out. In view of this, first, the information display processing system according to this exemplary embodiment identifies editing-amount increasing time period, each of which has a large editing amount, in order to identify time periods in which a discussion or a work operation has been carried out.

An editing-amount increasing time period is a time period which has a large editing amount per unit time. In order to extract an editing-amount increasing time period, a time period having a large editing amount needs to be identified. For this purpose, the editing-amount processing unit of the management device retrieves the list of whiteboards having a particular theme from the whiteboard data storing unit.

Subsequently, the editing-amount processing unit calculates a threshold value to be used for identifying editing-amount increasing time periods.

To calculate a threshold value, the editing-amount processing unit calculates the average editing amount per unit time for the list of whiteboards having the particular theme, by using data stored in the object data storing unit. The object data storing unit stores all the information regarding addition/modification of the objects. The editing-amount processing unit determines a threshold value on the basis of the calculated average editing amount.

Upon determination of the threshold value, the editing-amount processing unit obtains an editing-amount graph representing transition of the editing amount per unit time with time, for each whiteboard. The editing-amount processing unit identifies each time period having an editing amount exceeding the threshold value, as an editing-amount increasing time period, in the obtained editing-amount graph.

The identified editing-amount increasing time period has a certain time range on the time axis and has a possibility of appearing multiple times on the time axis of the single whiteboard.

Upon identification of editing-amount increasing time periods, the difference processing unit of the management device identifies objects corresponding to difference resulting from addition/modification between editing-amount increasing time periods.

When two editing-amount increasing time periods are specified at the time of receiving a difference display request, the difference processing unit retrieves an object set including objects added or edited between the specified editing-amount increasing time periods, from the object data storing unit by using the addition/modification times and dates for the corresponding whiteboard as a key. The retrieved object set corresponds to the difference between the editing-amount increasing time periods.

The difference extracting unit processes the objects for difference display so as to highlight the objects and returns the obtained data to the display device. The display device highlights the objects for difference display included in the returned data.

The difference processing unit is also capable of highlighting objects updated in a single editing-amount increasing time period. Upon receipt of a request for highlighting objects updated in a single editing-amount increasing time period, the difference processing unit retrieves the objects added or modified in the range of the editing-amount increasing time period, from the object data storing unit. The difference processing unit processes the retrieved object set so as to highlight the objects and returns the obtained data to the display device. The display device highlights the objects for difference display included in the returned data.

As described above, according to this exemplary embodiment, time periods in each of which a discussion or a work operation has been carried out is identified in an online whiteboard by using numerical values indicating the editing amounts per unit time. The difference between the identified discussions or work operations is displayed. Hence, the difference between the discussions or work operations is displayed effectively. Displaying the difference between the identified discussions or work operations enables browsing of the whiteboard up to the state where the discussions or work operations have been carried out.

Second Exemplary Embodiment

Description is given below of an example, as a second exemplary embodiment, in which editing amounts of figure objects and text objects are collectively treated by the use of the numbers of characters of the text objects, with reference to FIG. 19. The processing for collectively treating the editing amounts of figure objects and text objects together is carried out when an editing-amount display request is issued.

In the case where the editing amounts of text objects and figure objects are collectively treated, the editing amount of each figure object may be defined as in Equation 3 below.

(Editing amount of figure object)=(number of times of addition)+(number of times of modification)  (3)

In Equation 3, the number of time of addition and the number of times of modifications respectively indicate the number of times the figure object is added and the number of times the figure object is modified. Note that the definition of the editing amount of figure objects in Equation 3 is an example and the editing amount of figure objects may have a different definition. For example, the number of times of addition and the number of times of modifications may be differently weighted in Equation 3 in order to highlight one of the number of times of addition and the number of times of modifications.

Regarding text objects, the editing amounts need to be defined on the basis of the volume of text so as to be collectively treated with the editing amounts of figures.

Figure 19:
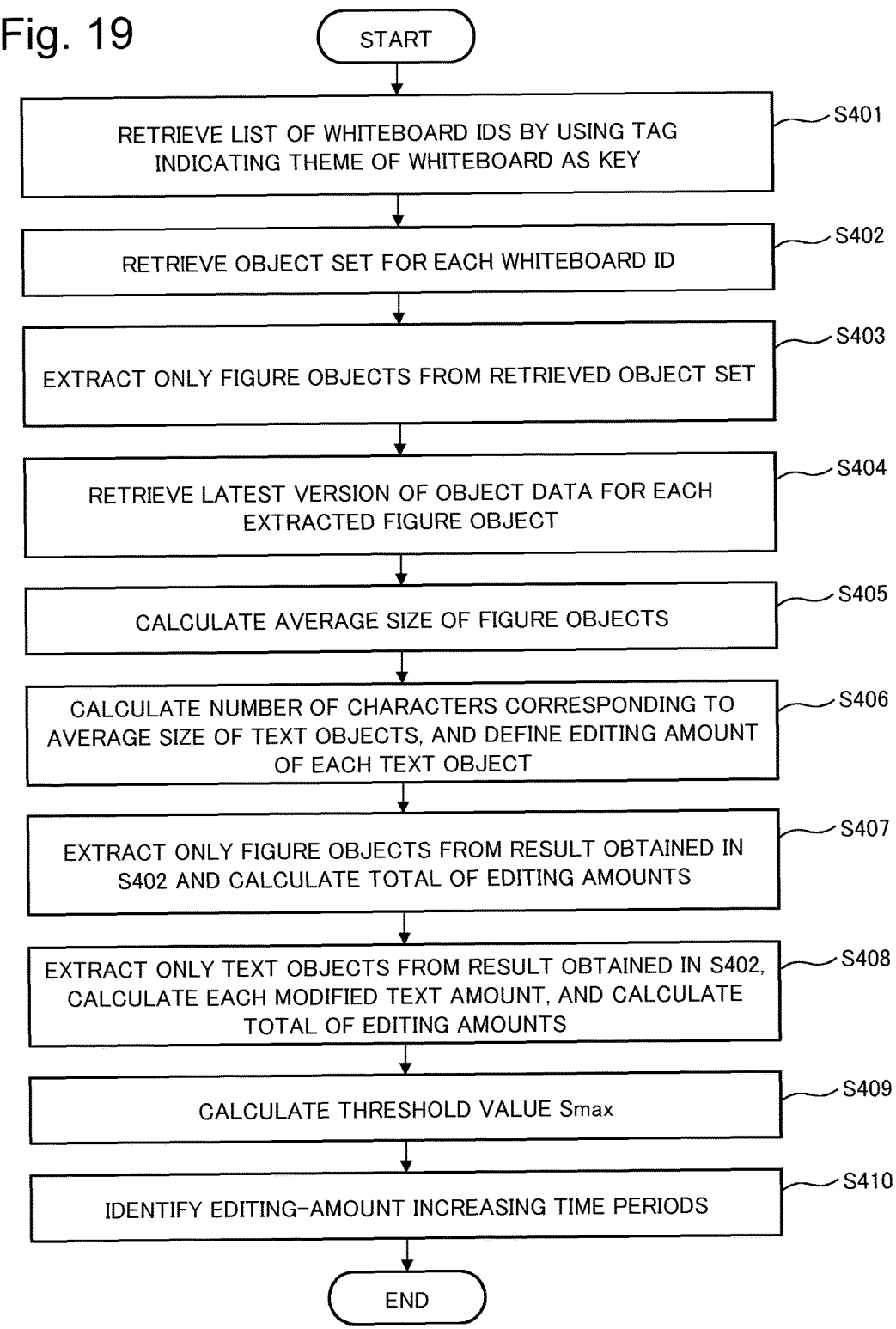
FIG. 19 is a flowchart presenting a procedure in the case of collectively treating together text objects and figure objects on a whiteboard in an information display processing system according to a second exemplary embodiment of the present invention.

In FIG. 19, first, the editing-amount calculating unit 431 acquires a list of whiteboard IDs having a tag indicating the same theme from the whiteboard data storing unit 22 by using the tag as a key (Step S401).

Upon acquisition of the list of whiteboard IDs, the editing-amount calculating unit 431 carries out the following processing for each whiteboard ID. First, the editing-amount calculating unit 431 retrieves an object set of each whiteboard ID from the object data storing unit 23 with reference to the addition times and dates and update times and dates in the corresponding particular period (Step S402).

The editing-amount calculating unit 431 extracts only figure objects from the object set retrieved in Step S402 (Step S403).

The editing-amount calculating unit 431 retrieves, for each of the extracted figure objects, the latest version of the object data with reference to the object ID (Step S404). The version of the object data having the largest version number is considered as the latest version.

The editing-amount calculating unit 431 calculates the total size (area) of the latest versions of the figure objects and calculates the average size of the figure objects by dividing the calculated total size of the figure objects by the number of figure objects (Step S405).

When the average size of the figure objects is calculated, the editing-amount calculating unit 431 determines, assuming a text object in average size, the number of characters which can be included in the text object in average size (Step S406). The number of characters which can be included in a text object in average size is determined by calculating the number of text characters which can be within the average size of the figure objects by the use of preset parameters on, for example, the size and font of text, the distance between characters, and the typeface of characters. Note that the calculation method for a text object in average size is not limited to the above and may be any.

On the assumption that the numerical value of a text object in average size is C, the editing amount of the text object may be defined as in Equation 4 below, for example.

(Editing amount of text object)=(number of times of addition)+(amount of modified text/$C$)  (4)

The numerical value of a text object in average size indicates the number of characters which can be included in a figure object in average size. In Equation 4, the number of times of addition indicates the number of times a text object is added. In Equation 4, the amount of modified text indicates the difference in number of characters between the retrieved text object and the previous version of the text object.

In the case where the editing amount of a text object is defined as in Equation 4, the editing amounts of figure objects and text objects per unit area have the same measure and can consequently be treated collectively.

The editing amount of a figure object per unit time may be defined as in Equation 5 below, for example.

(Editing amount of figure object per unit time)= (number of times of addition+number of times of modification)/time  (5)

The number of times of addition and the number of times of modification in Equation 5 indicate the number of times a figure object is added and the number of times a figure object is modified, respectively.

The editing amount of a text object per unit time may be defined as in Equation 6 below, for example.

(Editing amount per unit time of text object)=(number of times of addition+amount of modified text/$C$)/time  (6)

The number of times of addition in Equation 6 indicates the number of times a text object is added.

The editing-amount calculating unit 431 extracts only the figure objects from the object set retrieved in Step S402 and determines the number of the extracted figure objects to be the total editing amount of the figure objects (Step S407).

Thereafter, the editing-amount calculating unit 431 extracts only the text objects from the object set retrieved in Step S402. The editing-amount calculating unit 431 determines the difference in number of characters (amount of modified text) between each extracted text object and the previous version of the text object and obtains the total editing amount of the text objects (Step S408). When any of the objects in the retrieved object set does not have the previous version of the data, the editing-amount calculating unit 431 acquires the data of the previous version from the object data storing unit 23 by using the object ID and the version as a key. In terms of addition of a text object, the content of the object is directly considered as the amount of modified text.

The editing-amount calculating unit 431 calculates the total object editing amount by adding the total editing amount of the figure objects calculated in Step S407 and the total editing amount of the text objects calculated in Step S408. The editing-amount calculating unit 431 calculates the average editing amount per unit time by dividing the calculated total object editing amount by the number of unit times corresponding to the particular period and calculates the threshold value Smax on the basis of the calculated average editing amount (Step S409).

The editing-amount calculating unit 431 calculates, as defined, the editing amount per unit time for each whiteboard on the basis of the object set retrieved in Step S402 and identifies editing-amount increasing time periods (Step S410).

Description is given above of the second exemplary embodiment. According to the second exemplary embodiment, the editing amounts of text objects and figure objects can be treated collectively.

Third Exemplary Embodiment

In the first exemplary embodiment, description is given of the method of determining, for each object edited between two editing-amount increasing time periods, which one (discussion point) of the editing-amount increasing time periods is to include update of the object, for difference display. On a whiteboard, multiple objects, instead of a single object, are often added or modified together. In view of such a case, it is sometimes better to determine which one of editing-amount increasing time periods is to include object addition/modification, for each group of a certain number of objects (referred to as object group below) instead of each single object.

Figure 20:
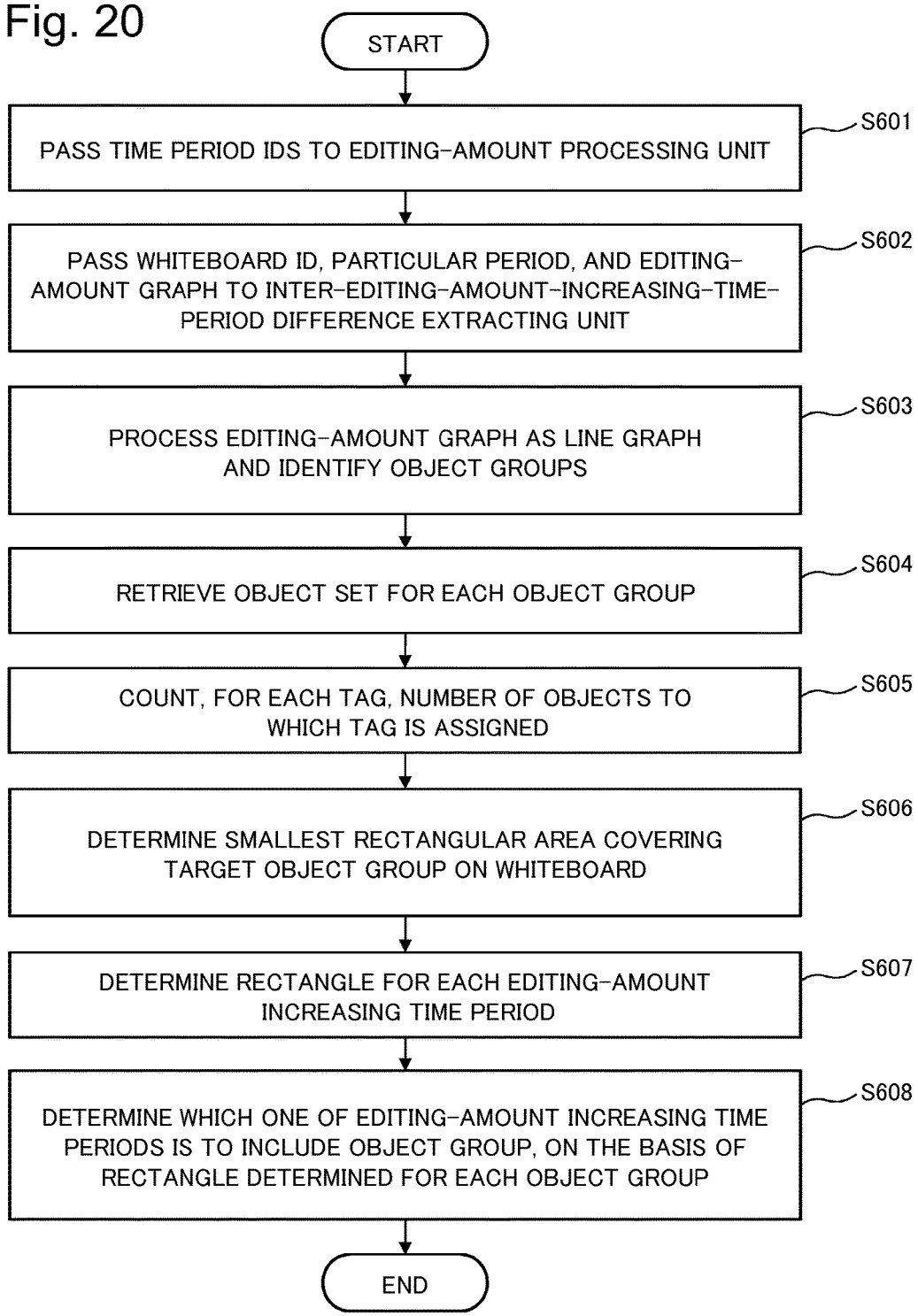
FIG. 20 is a flowchart presenting a procedure in the case of treating, as an object group, a group of objects added or modified on a whiteboard in an information display processing system according to a third exemplary embodiment of the present invention.

In a third exemplary embodiment, description is given of a method of determining which one of editing-amount increasing time periods is to include object addition/modification, for each object group, with reference to FIG. 20. Determination in the case of determining which one of editing-amount increasing time periods is to include object addition/modification for each object group is made by the use of an editing-amount graph as in the case of making determination for each single object.

In FIG. 20, the inter-editing-amount-increasing-time-period difference extracting unit 4412 passes the IDs of editing-amount increasing time periods to the editing-amount processing unit 43 (Step S601).

The editing-amount processing unit 43 retrieves data including a whiteboard ID, a corresponding particular period, and a corresponding editing-amount graph from the editing-amount storing unit 432 by using the IDs of the editing-amount increasing time periods as a key and passes the retrieved data to the inter-editing-amount-increasing-time-period difference extracting unit 4412 (Step S602).

The inter-editing-amount-increasing-time-period difference extracting unit 4412 processes the editing-amount graph of object addition/modification between the editing-amount increasing time periods, as a line graph, and identifies each rising part as a single object group (Step S603).

In the case of processing the editing-amount graph as a line graph, the polygonal line consisting of line segments joining the midpoints of the respective upper sides of rectangles in the editing-amount histogram is considered as a frequency polygon. Each rising part is defined by a part in which the inclination of a line segment of the frequency polygon resulting from an increase in time increases from 0, then decreases to 0, further decreases from 0, and increases again to 0 (0 to +, + to 0, 0 to −, and − to 0). In other words, each rising part is a part in which the frequency polygon forms an inverted V-shape. Note that, the determination using a frequency polygon takes into account the range excluding the editing-amount increasing time periods, and the frequency at each end of the target range is considered to be 0.

Figure 21:
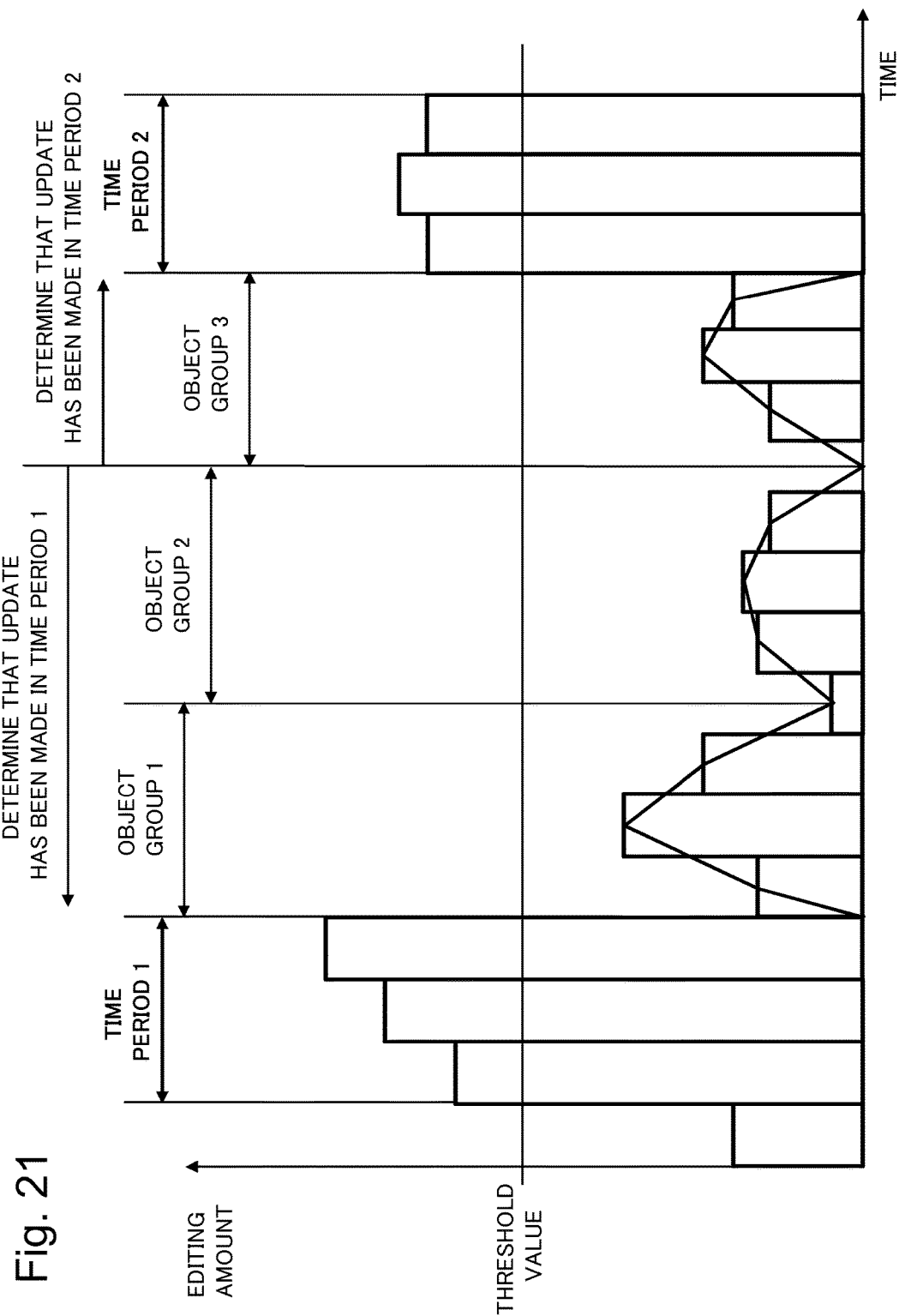
FIG. 21 is a schematic diagram illustrating an example of an editing-amount graph obtained in the information display processing system according to the third exemplary embodiment of the present invention.

FIG. 21 presents an editing-amount histogram similar to FIG. 11, the histogram providing an example in which a frequency polygon is added to an editing-amount histogram. In FIG. 21, three rising parts (parts in the frequency polygon), indicating respective object groups 1 to 3, are included in the part of the editing-amount histogram between the time period 1 and the time period 2.

Then, the inter-editing-amount-increasing-time-period difference extracting unit 4412 extracts an object set for each object group in each time range where the frequency polygon forms a rising part, in order to retrieve tag information assigned to each object set of the object group (Step S604). In this event, the inter-editing-amount-increasing-time-period difference extracting unit 4412 extracts the object set from the object data storing unit 23 by using the whiteboard ID, the addition times and dates, and the update times and dates as a key.

The inter-editing-amount-increasing-time-period difference extracting unit 4412 counts, for each kind of tags, the number of objects to which the kind of tag is assigned (Step S605).

With reference to the retrieved object set, the position and size of each object in each object group are obtained. The inter-editing-amount-increasing-time-period difference extracting unit 4412 determines the smallest rectangular area (referred to as an object group rectangle below) covering the target object group on the whiteboard, from the positions and sizes of the objects (Step S606). The object group rectangle is defined as in FIG. 8.

Thereafter, a rectangle (referred to as a rectangle for the editing-amount increasing time period below) including the objects edited in each editing-amount increasing time period is determined (Step S607). Since the method of determining the rectangle for the editing-amount increasing time period is as described with reference to FIGS. 14 and 15, detailed description thereof is omitted.

The inter-editing-amount-increasing-time-period difference extracting unit 4412 determines which one of editing-amount increasing time periods is to include the object group, by using the object group rectangle and rectangles for the editing-amount increasing time period (Step S608). When the object group rectangle overlaps neither of the editing-amount-increasing-time period rectangles, determination may be made on the basis of the distance between the central positions of the object group rectangle and each rectangle for the editing-amount increasing time period.

Subsequently, the difference processing unit 44 transmits the object set edited between the editing-amount increasing time periods to the display device 3 on the basis of the above determination result. When the display device 3 displays the received object set, the objects edited between the two editing-amount increasing time periods are displayed on the whiteboard.

By the use of the method in FIG. 20, one of the time periods to include update of the objects of each object group can be determined as in FIG. 21.

Description is given above of the method of determining, for each object group, which one of two editing-amount increasing time periods is to include object addition/modification made between the two time periods.

Description is given below of a method of determining, for each object group, which one of two editing-amount increasing time periods is to include object addition/modification made between the two time periods, through concrete examples presented in FIGS. 22 and 23.

FIG. 22 illustrates an example of a table 300 storing, for each of objects having object IDs 1 to 10, the position on the whiteboard, the size, and the update time and date. In the example in FIG. 22, it is assumed that the time period in which the update date is December 1 is determined to be an editing-amount increasing time period 1 and that the time period in which the update date is December 9 is determined to be an editing-amount increasing time period 2. FIG. 23 illustrates an example in which the objects stored in the table 300 in FIG. 22 are displayed on a whiteboard. The number in each object rectangle (in solid lines) in FIG. 23 corresponds to the object ID in the table 300 in FIG. 22.

Figure 23:
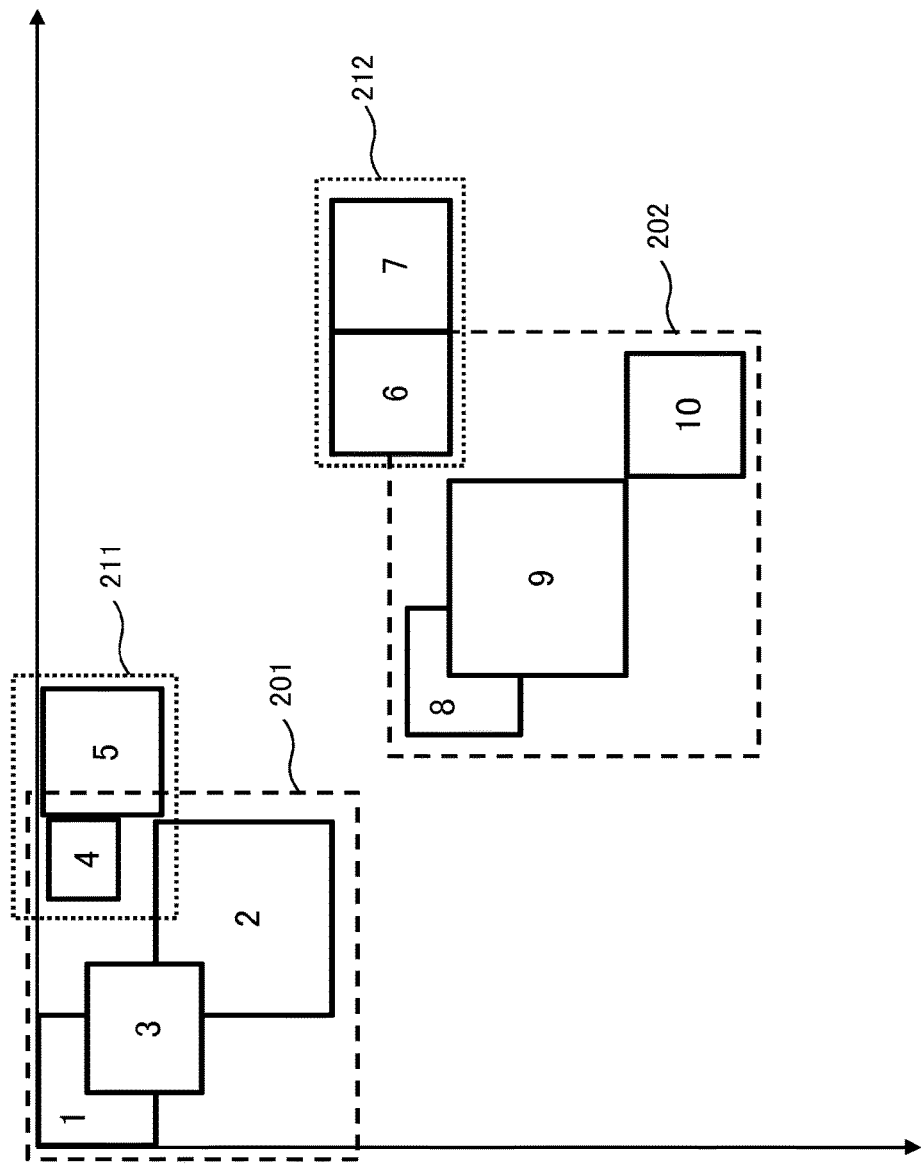
FIG. 23 is a schematic diagram illustrating an example of objects added or modified on a whiteboard in the information display processing system according to the third exemplary embodiment of the present invention.

In FIG. 23, objects 1 to 3 are included in the time period 1, and the rectangle of the time period 1 corresponds to a part (rectangle 201) indicated by broken lines at the upper left in the diagram. In FIG. 23, objects 8 to 10 are included in the time period 2, and the rectangle of the time period 2 corresponds to a part (rectangle 202) indicated by broken lines at the lower right in the diagram.

In FIG. 23, the objects between the two time periods are grouped into a group 1, which includes the objects 4 and 5, and a group 2, which includes the objects 6 and 7. The frame in dotted lines surrounding the objects 4 and 5 is the rectangle (rectangle 211) of the group 1. The frame in dotted lines surrounding the objects 6 and 7 is the rectangle (rectangle 212) of the group 2.

In FIG. 23, since the rectangle 211 of the group 1 overlaps only the rectangle 201 of the time period 1, it is determined that the updates of the group 1 are in the time period 1. In FIG. 23, since the rectangle 212 of the group 2 overlaps only the rectangle 202 of the time period 2, it is determined that the updates of the group 2 are in the time period 2.

Description is given above of the third exemplary embodiment. According to the third exemplary embodiment, objects edited between editing-amount increasing time periods can be processed together as an object group. This can simplify the processing for the objects edited in a time period having the editing amount per unit time not exceeding a threshold value, so that processing such as difference display can be carried out more efficiently.

Fourth Exemplary Embodiment

In the first exemplary embodiment, the editing amount of the entire whiteboard is considered. However, it is sometimes more effective to consider the editing amount of each user. For example, assume a case where the discussion carried out on a whiteboard is a material review by the entire team. In such a case, after the material review by the entire team (multiple users), one of the multiple users may amend the material on the basis of the review results. In this operation, editing-amount increasing time periods are extracted in the material review by the entire team as a result of large editing amounts, but no editing-amount increasing time period may be extracted in the material amendment by the single user. This is because the editing amount per unit time tends to be small in the case of operation by a single user. In order to extract editing-amount increasing time periods without overlooking such a case, attention needs to be paid also to the editing amount of each user.

In view of this, in a fourth exemplary embodiment, the editing amount of each user is used in the calculation of a threshold value described in the first exemplary embodiment, in order to extract time periods with respect to each user.

The configuration and operation of an information display processing system according to the fourth exemplary embodiment are the same as those in the first exemplary embodiment. The difference between the first exemplary embodiment and the fourth exemplary embodiment is that editing by users is managed and processed individually for the users.

FIG. 24 presents an example of using a table 400, which associates user IDs and object IDs, as an example of managing the editing amounts with respect to each user. In the example in FIG. 24, the users having respective users IDs 1 and 2 have a discussion on a whiteboard. Accordingly, updates are made at time points close to each other. The user having a user ID 3 performs amendment operation on the material on which the discussion has been carried out, and hence the updates by the user having the user ID 3 have been made at time points later than those of the updates by the users having the user IDs 1 and 2.

In this case, the processing unit 40 calculates editing amounts with reference to the table 400 in FIG. 24. The processing unit 40 carries out processing to obtain the editing amount of each user with reference to the user IDs in the table 400 in FIG. 24. In this exemplary embodiment, the processing is carried out using the same method as that described in the above exemplary embodiments except that the user IDs are used. Note that the table 400 in FIG. 24 is an example and is not to limit the processing according to this exemplary embodiment.

Figure 25:
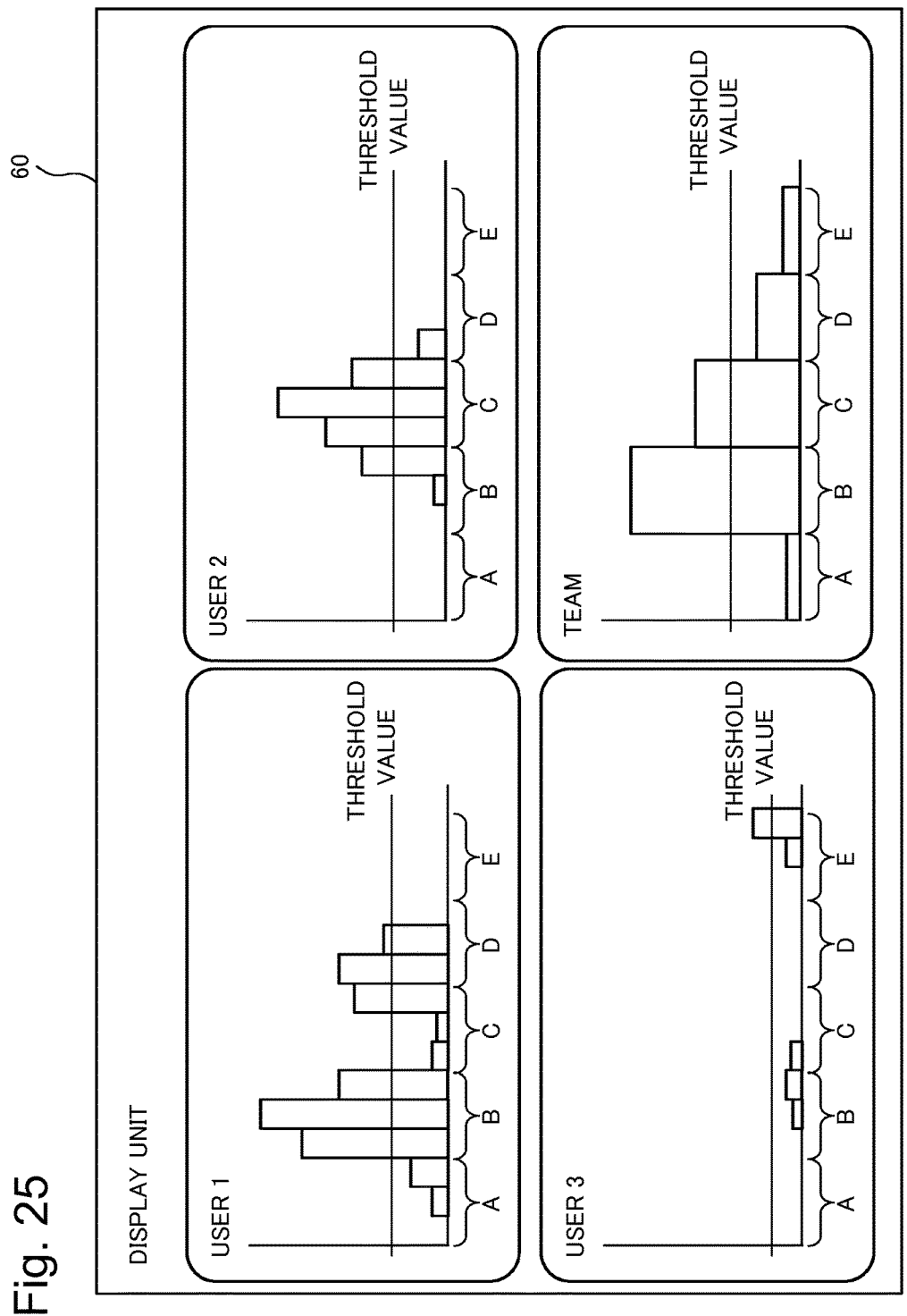
FIG. 25 is a schematic diagram illustrating an example of a screen display displayed by a display unit of a display device included in the information display processing system according to the fourth exemplary embodiment of the present invention.

FIG. 25 illustrates an example in which the editing amounts of respective users and the editing amount of the entire team are displayed by the display unit 60 in the case where three users having respective user IDs 1 to 3 carries out work via a shared whiteboard. In the example in FIG. 25, it is assumed that the user 3 summarizes the information on the whiteboard. In FIG. 25, the horizontal axis represents time, and the vertical axis represents the editing amount per unit time, for a corresponding one of the users and the team. It is assumed that the scale of the vertical axis is different among the graphs and that the threshold value is also different among the graphs. With respect to the horizontal axis, the time period is divided into five time periods A to E, and, for each user, each time period is further divided into three shorter time periods.

According to FIG. 25, with respect to the users 1 and 2, the editing amounts in the time periods B to D are large. In contrast, with respect to the user 3, the editing amounts are large in the time period E. On the basis of the total of the editing amounts of all the users, the graph of the team at the lower right of the diagram is obtained. With reference to the graph of the team only, the time period including the time period B and the time period C is identified as an editing-amount increasing time period, so that the amendment work by the user 3 is not identified as an editing-amount increasing time period. With reference to the graph of the user 3, the editing amounts in the time period E are found to be large, the time period E is identified as a time period having a large editing amount by the user 3. Note that FIG. 25 is a schematic diagram for illustrating the fourth exemplary embodiment and is not to limit the processing according to the fourth exemplary embodiment.

As described above, according to the fourth exemplary embodiment, the work by the team, which is obtained by adding up the works by individual users, and the work by each user can be extracted separately. This enables, for example, display of a whiteboard of the past and difference display in such a manner as to include both the work by the team and the works by individuals.

Fifth Exemplary Embodiment

In the first exemplary embodiment, determination is made about which one of two time periods is to include an update of a target object, on the basis of the rectangle-object distances with reference to the rectangles for the editing-amount increasing time period and the object, when the object overlaps neither of the rectangles. However, determination may be made about the relationship with each rectangle on the basis of the content of the object, instead of distance.

A fifth exemplary embodiment provides a method of determining which one of two time periods is to include an update of a target object, on the basis of the content of the object.

A tag indicating the intension of a whiteboard or object may be assigned to each whiteboard or object in order to make it easier for a user to find a target whiteboard. Generally, multiple objects on a whiteboard indicate single content as a group in many cases. In such a case, tags of the same kind are assigned to the multiple objects. Examples of the tags in the object data storing unit 23 are "product design" and "function idea", and such a tag indicating the content of the object group is assigned to the objects.

When tags are correctly assigned to objects, it is better to make determination on the basis of the contents of the objects than the distance with each rectangle for the editing-amount increasing time period, in order to more accurately display the difference. Description is given below of an example of determining which one of two editing-amount increasing time periods is to include each object, on the basis of the content of the object.

[Determination for Each Object]

Figure 26:
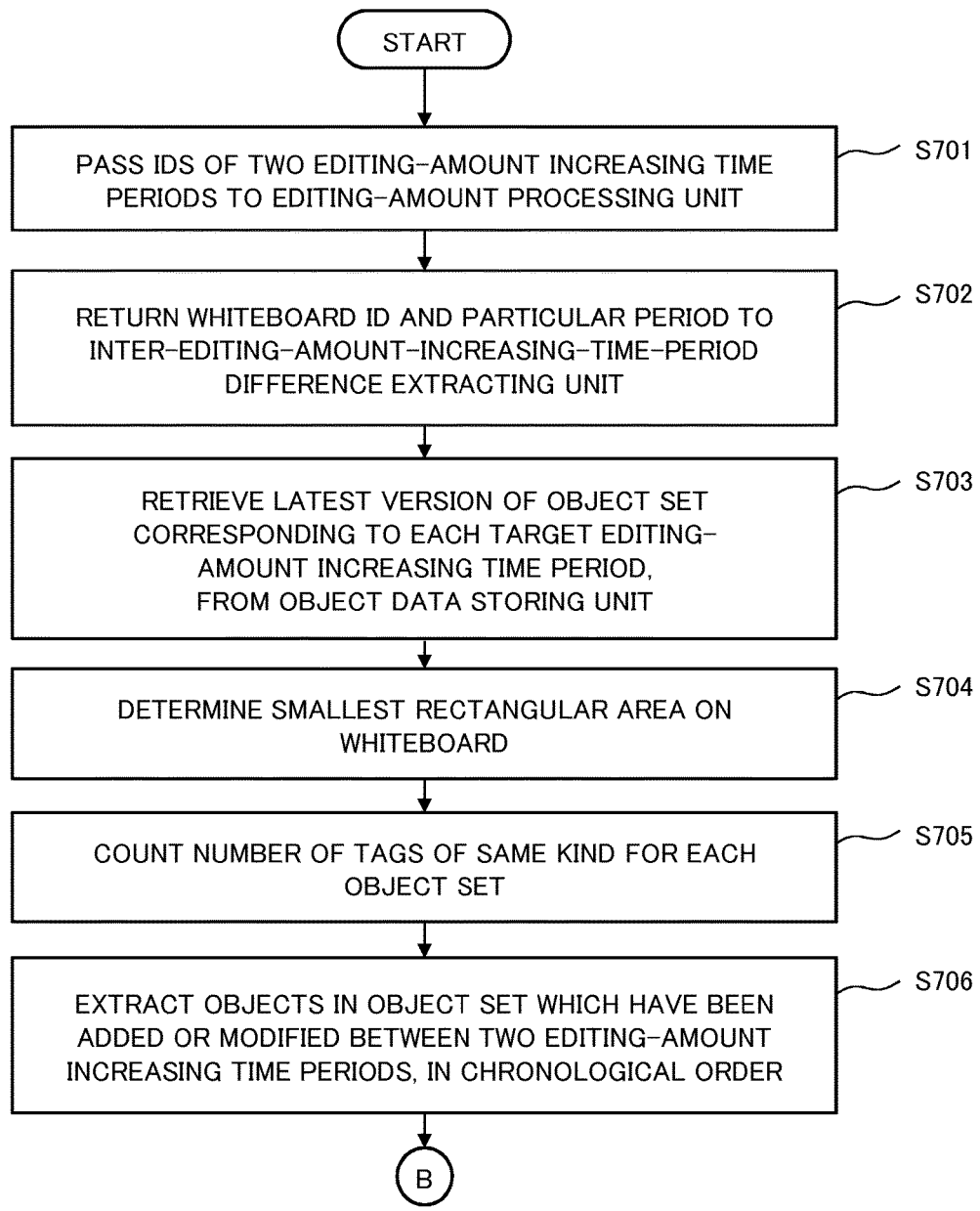
FIG. 26 is a flowchart of a process in an information display processing system according to a fifth exemplary embodiment of the present invention.
Figure 27:
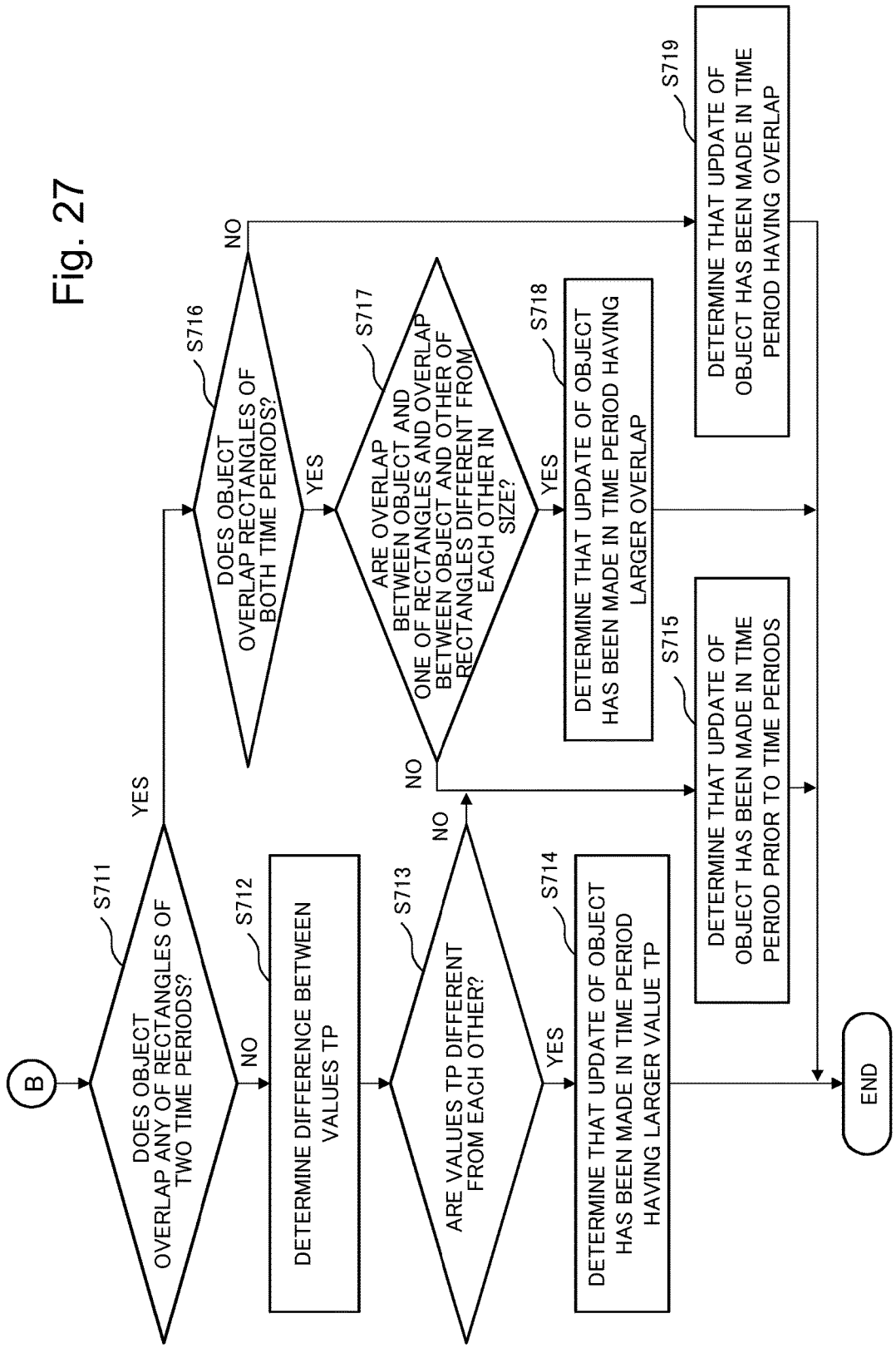
FIG. 27 is a flowchart of the process in the information display processing system according to the fifth exemplary embodiment of the present invention.

First, description is given of an example in which the objects updated between two time periods include objects which overlap neither of the rectangles of the time periods, in the case where determination is made for each object about a time period which is to include an update of the object, with reference to FIGS. 26 and 27.

The processing in FIG. 26 includes following Step S705 inserted between Steps S304 and S305 in FIG. 14. In FIG. 26, since the operations in Steps S701 to S704 and Step S706 are the same as those in Steps S301 to S304 and Step S305 in FIG. 14, description thereof is omitted.

In FIG. 26, when objects are extracted for each editing-amount increasing time period in Step S704, the difference processing unit 44 passes the extracted objects to the object-tag-information calculating unit 443. The object-tag-information calculating unit 443 retrieves tag information of each of the objects, counts the number of tags of each kind, and obtains a numerical value TP for each tag according to Equation 7 (Step S705).

$$TP(\text{particular tag}) = (\text{number of objects having particular tag}) / (\text{number of all objects}) \quad (7)$$

When no particular tag is found, the value TP is defined as 0. In this example, TP is expressed by specifying a kind of tag in parentheses, e.g., TP (particular tag). The number of all objects in Equation 7 corresponds to the total number of all objects each having a tag.

Examples of the value TP when the particular tag is one of tags A to D are presented in Equations 8 to 11 below.

$$TP(\text{tag } A) = 5/10 \quad (8)$$

$$TP(\text{tag } B) = 3/10 \quad (9)$$

$$TP(\text{tag } C) = 1/10 \quad (10)$$

$$TP(\text{tag } D) = 1/10 \quad (11)$$

Subsequently, the operations in Steps S711 to S719 in the flowchart in FIG. 27 are carried out. In the processing in FIG. 27, the operations in Steps S312 to S315 in the processing in FIG. 15 are replaced with the operations in Steps S712 to S715 in FIG. 27. Since the operations in Step S711 and Steps S716 to S719 in FIG. 27 are the same as the operations in Step S311 and Steps S316 to S319 in FIG. 15, description thereof is omitted. Description is given below of the operations in Step S711 and thereafter.

When the target object overlaps neither of the rectangles of the two editing-amount increasing time periods (No in Step S711), the object-tag-information calculating unit 443 determines which one of the time periods is to include the target object, on the basis of the content of the tag. The object-tag-information calculating unit 443 retrieves tag information (TP(particular tag)) of the target object, compares the numerical values TP(particular tag) of the two time periods, and determines which time period is to include the target object (Step S712).

Specifically, in FIG. 27, the object-tag-information calculating unit 443 determines whether the comparison-target numerical values TP(particular tag) are different from each other (Step S713).

When the comparison-target numerical values TP(particular tag) are different from each other (Yes in Step S713), the object-tag-information calculating unit 443 checks which time period has the larger comparison-target value TP(particular tag). The object-tag-information calculating unit 443 determines that the target object has been updated in the time period having the larger comparison-target value TP(particular tag) (Step S714).

When the comparison-target numerical values TP(particular tag) are not different from each other (No in Step S713), that is, when the comparison-target numerical values TP(particular tag) are the same, the object-tag-information calculating unit 443 determines that the target object has been updated in a time period prior to the time periods (Step S715).

On the basis of the above determination result, the difference processing unit 44 transmits the object set edited between the editing-amount increasing time periods to the display device 3. The display device 3 displays the objects edited between the two editing-amount increasing time periods on the whiteboard by displaying the received object set.

Figure 29:
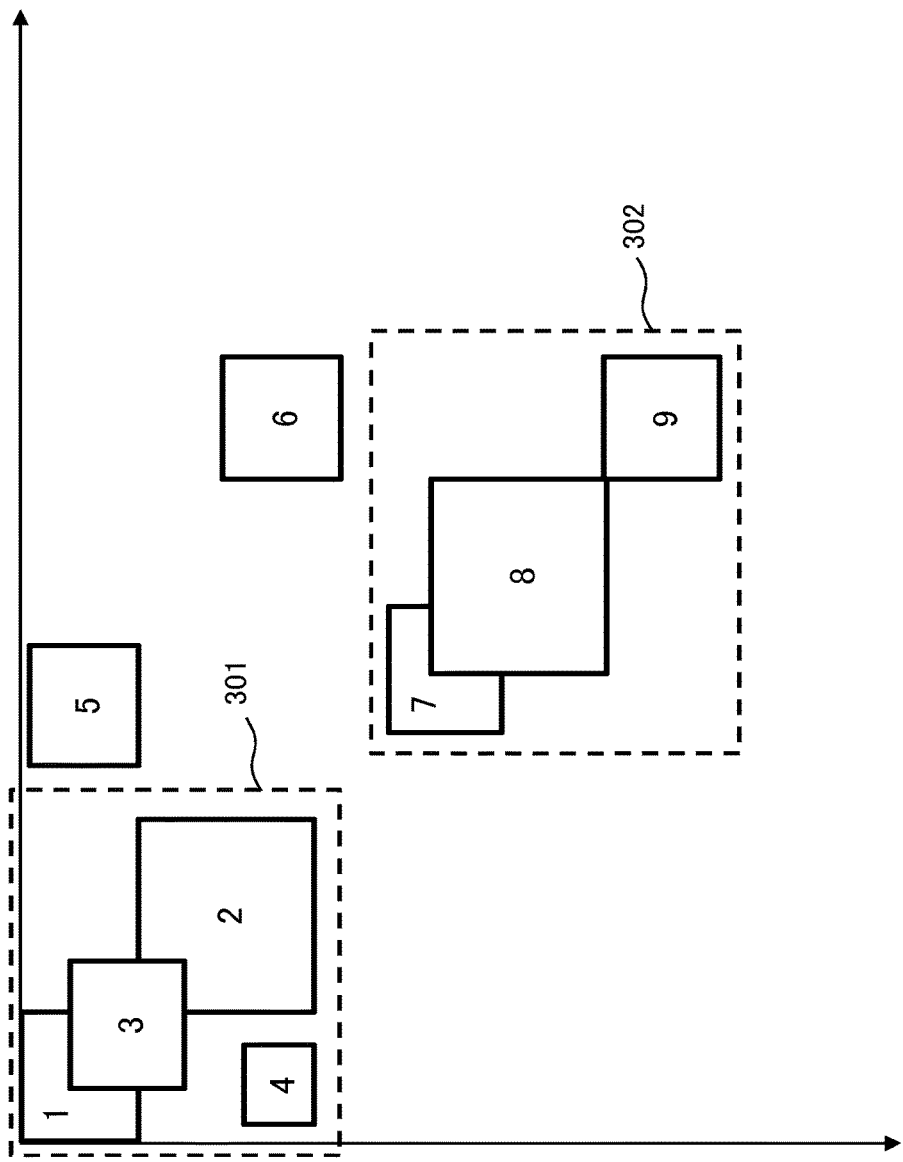
FIG. 29 is a schematic diagram illustrating an example of objects added or modified on a whiteboard of the information display processing system according to the fifth exemplary embodiment of the present invention.

FIGS. 28 and 29 provide a concrete example in which some of the objects updated between two editing-amount increasing time periods overlap neither of the rectangles of the time periods, in the case of determining, for each object, a time period to include an update.

In a table 510 in FIG. 28, it is assumed that the time period in which the update date is December 1 is determined to be an editing-amount increasing time period 1 and that the time period in which the update date is December 9 is determined to be an editing-amount increasing time period 2. In this case, as presented in FIG. 29, the editing-amount increasing time period 1 includes objects 1 to 3, and the rectangle for the editing-amount increasing time period 1 is a part (rectangle 301) illustrated in broken lines on the left in the diagram. In FIG. 29, the editing-amount increasing time period 2 includes objects 7 to 9, and the rectangle for the editing-amount increasing time period 2 is a part (rectangle 302) illustrated in broken lines on the right in the diagram.

The content of each tag is as presented in the table 510 in FIG. 28. The majority of the objects 1 to 3 included in the editing-amount increasing time period 1 (rectangle 301) have design as a tag, so that the value TP(design) is large. The majority of the objects 7 to 9 included in the editing-amount increasing time period 2 (rectangle 302) have function as a tag, so that the value TP(function) is large.

Determination is made for the objects 4 to 6 updated between the two editing-amount increasing time periods, in chronological order.

The object 4 overlaps only the rectangle 301 of the time period 1. Accordingly, the object-tag-information calculating unit 443 determines that the object 4 has been updated in the time period 1.

The object 5 is included in neither of the rectangles, and hence a determination is made by using the values TP. With reference to the table 510 in FIG. 28, the object 5 has a tag indicating design. Accordingly, the object-tag-information calculating unit 443 determines that the object 5 has been updated in the time period 1, which has a larger value TP(design).

Similarly, the object 6 is included in neither of the rectangles of the editing-amount increasing time periods, and hence a determination is made by using the values TP. With reference to the table 510 in FIG. 28, the object 6 has a tag indicating function. Accordingly, the object-tag-information calculating unit 443 determines that the object 6 has been updated in the time period 2, which has a larger value TP(function).

Description is given above of the processing carried out when the objects updated between two time periods include objects which overlap neither of the rectangles of time periods, in the case of determining, for each object, a time period in which the object has been updated.

[Determination for Each Object Group]

Figure 30:
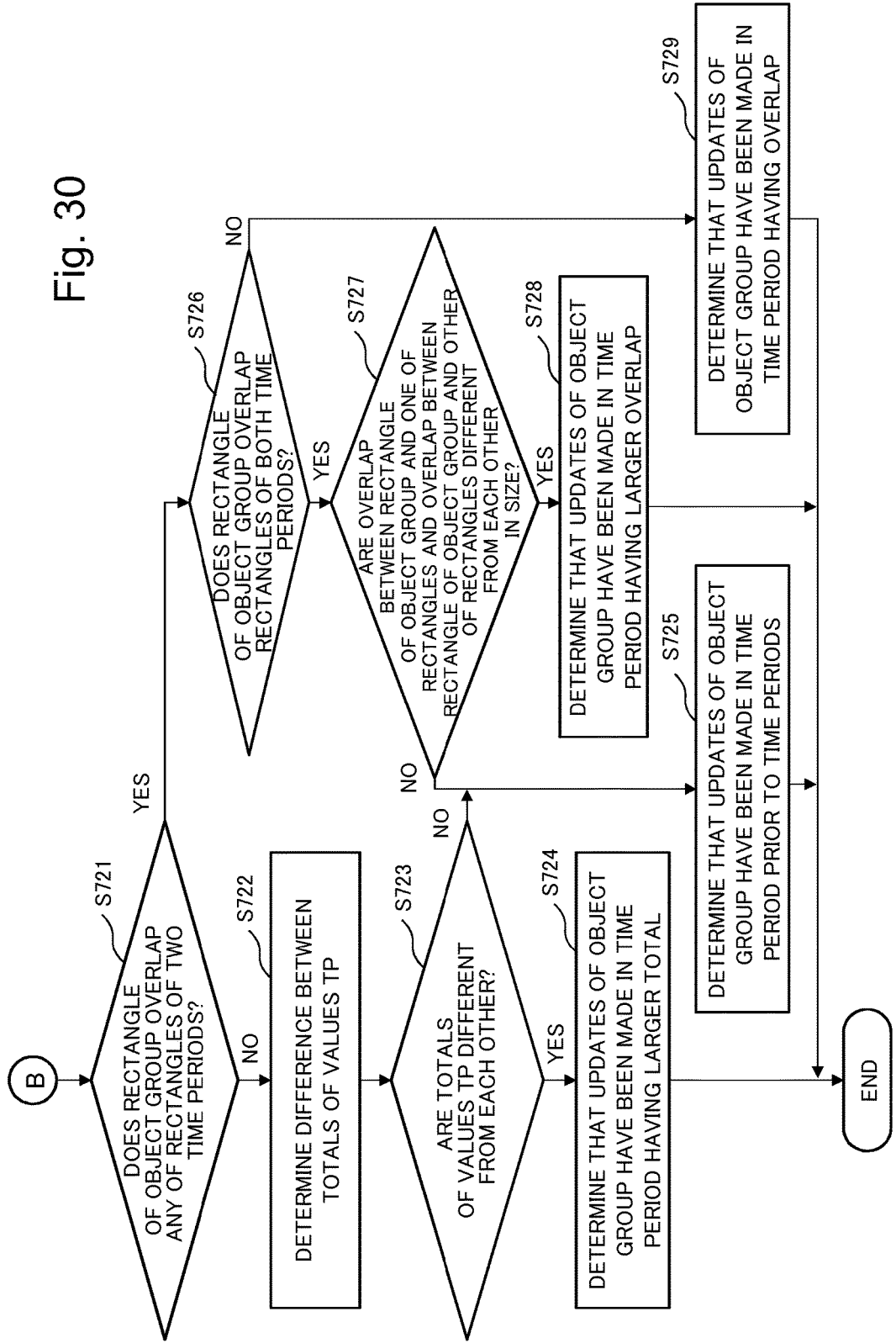
FIG. 30 is a flowchart of the process in the information display processing system according to the fifth exemplary embodiment of the present invention.

Next, description is given of a case of determining, for each group of objects (object group), which one of time periods is to include an update of the object group, when the rectangle of the object group between the time periods overlaps neither of the rectangles of the time periods, with reference to FIGS. 26 and 30. Since the processing in FIG. 26 is the same in both the case of making a determination for each object group and the case of making a determination for each object, description thereof is omitted. The processing following Step S706 in FIG. 26 is described below with reference to FIG. 30.

In FIG. 30, when the rectangle of the object group overlaps neither of the rectangles of the two editing-amount increasing time periods (No in Step S721), the object-tag-information calculating unit 443 determines which one of the time periods is to include the target object group, on the basis of the contents of the tags. Specifically, on the basis of the number of tags of each kind assigned to the object group, the object-tag-information calculating unit 443 makes a determination by comparing the totals of the values TP(particular tag) of the kinds of the tags (Step S722). A method of calculating the total of values TP is described below.

The object-tag-information calculating unit 443 calculates the total of values TP(particular tag) according to Equation 12 below.

$$(\text{Total of } TPs(\text{particular tag})) = \Sigma\{TP(\text{particular tag}) \times (\text{number of particular tags calculated for object group})\} \quad (12)$$

In other words, in FIG. 30, the object-tag-information calculating unit 443 determines whether the totals of the comparison-target values TP(particular tag) are different from each other (Step S723).

When the totals of the values TP(particular tag) are different from each other (Yes in Step S723), the object-tag-information calculating unit 443 determines that the target object group is included in the time period having a larger total of the values TP(particular tag) (Step S724).

When the totals of the values TP(particular tag) are not different from each other (No in Step S723), that is, when the totals of the values TP(particular tag) are the same, the object-tag-information calculating unit 443 determines that the target object group is updated in a time period prior to the time periods (Step S725).

On the basis of the above determination result, the difference processing unit 44 transmits the object set edited between the editing-amount increasing time periods to the display device 3. By displaying the received object set, the display device 3 displays the objects edited between the two editing-amount increasing time periods on the whiteboard.

Figure 32:
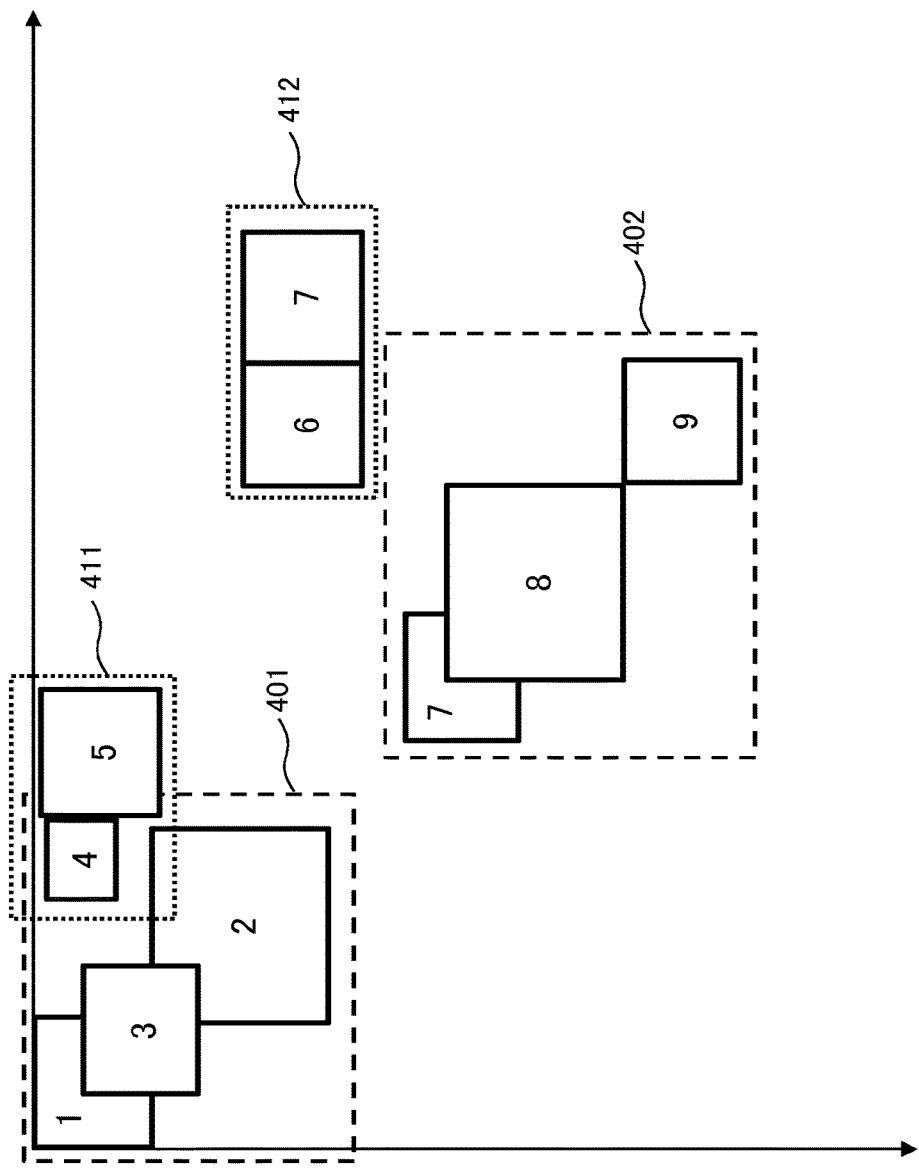
FIG. 32 is a schematic diagram illustrating an example of objects added or modified on the whiteboard of the information display processing system according to the fifth exemplary embodiment of the present invention.

FIGS. 31 and 32 illustrate a concrete example of determining, for each object group, which one of time periods is to include updates of the object group, when the rectangle of the object group between time periods overlaps neither of the rectangles of the time periods.

In a table 520 in FIG. 31, it is assumed that the time period in which the update date is December 1 is determined to be an editing-amount increasing time period 1 and that the time period in which the update date is December 9 is determined to be an editing-amount increasing time period 2. In this case, as presented in FIG. 32, the editing-amount increasing time period 1 includes objects 1 to 3, and the rectangle for the editing-amount increasing time period 1 is a part (rectangle 401) illustrated in broken lines on the left in the diagram. In FIG. 32, the editing-amount increasing time period 2 includes objects 8 to 10, and the rectangle for the editing-amount increasing time period 2 is a part (rectangle 402) illustrated in broken lines on the right in the diagram.

The target object groups are those between the two time periods. An object group 1 includes objects 4 and 5, and the part (rectangle 411) surrounding the objects 4 and 5 in dotted lines is the rectangle of the object group 1. An object group 2 includes objects 6 and 7, and the part (rectangle 412) surrounding the objects 6 and 7 in dotted lines is the rectangle of the object group 2.

The content of each tag is as presented in the table 520 in FIG. 31. The majority of the objects 1 to 3 (rectangle 401) included in the editing-amount increasing time period 1 have design as a tag, and hence the value TP(design) is large. The majority of the objects 7 to 9 (rectangle 402) included in the editing-amount increasing time period 2 have function as a tag, and hence the value TP(function) is large.

Determination is made for the objects 4 to 7 updated between the two editing-amount increasing time periods, in chronological order.

The rectangle 411 of the object group 1 including the objects 4 and 5 overlaps only the rectangle 401 of the time period 1. Accordingly, the object-tag-information calculating unit 443 determines that the object group 1 has been updated in the time period 1.

The rectangle 412 of the object group 2 including the objects 6 and 7 overlaps neither of the rectangles of the two time periods, and hence a determination is made by using the total of the values TP. The tags of the objects included in the object group 2 are a single function tag and a single test tag.

The time period 1 includes two function tags including that of the object 4 and no test tag, and hence the value TP(function) is 2/3 and the value TP(test) is 0. Consequently, the total of the values TP in the time period 1 is 2/3 according to Equation 13.

$$TP(\text{function}) \times 1 + TP(\text{test}) \times 1 = 2/3 \quad (13)$$

The time period 2 includes three function tags and no test tag, and hence the value TP(function) is 3/3=1 and the value TP(test) is 0. Consequently, the total of the values TP in the time period 2 is 1 according to Equation 14.

$$TP(\text{function}) \times 1 + TP(\text{test}) \times 1 = 1 \quad (14)$$

Since the total of the values TP of the object group 2 is larger in the time period 2, the object-tag-information calculating unit 443 determines that the object group 2 has been updated in the time period 2.

Description is given above of the processing carried out when the rectangle of an object group between time periods overlaps neither of the rectangles of the time periods in the case of determining, for each object group, which one of the time periods is to include updates.

As described above, according to the fifth exemplary embodiment, it is possible to make a determination on the basis of the content of each object (tag) when determining which one of two time periods is to include addition/modification of the target object. This enables difference display based on the content of each object, which makes it easier to review editing for each content of objects.

A list of effects obtained by the information display processing system according to any one of the first to fifth exemplary embodiments of the present invention is provided below.

The first effect is that each time range having a large editing amount can be extracted through the use of the editing amounts per unit time, which enables a user to find each time period in which a discussion or a work operation has been carried out on a whiteboard.

The second effect is that, by extracting each time period having a large editing amount, difference made in the state of a whiteboard corresponding to the extracted time period or between time periods each having a large editing amount can be displayed.

The third effect is that a user can be informed of each time period for difference display by extracting each time period having a large editing amount.

The fourth effect is that, by defining editing amounts, the editing amounts of figure objects and text objects can be treated collectively.

The fifth effect is that difference can be displayed in relation to updates of objects between time periods each having a large editing amount, by taking account of the positional relationship of the objects with reference to the time range in which each object is added or modified in each time period having a large editing amount. This enables meaningful and effective difference display in comparison with the case of not taking account of the positional relationship of the objects with reference to the time range in which each object is added or modified.

In a general online whiteboard, a user needs to manually make settings in order to specify a time point of a whiteboard to view and a time point of difference to be displayed. However, on a general online whiteboard, multiple users perform editing for a discussion or a work operation in different time periods. This leads to a problem that it is difficult to identify a time period in which a discussion or a work operation has been performed on a whiteboard.

In addition to the above, a general online whiteboard has a problem that it is difficult for a user to identify a time period at which additions and modifications have been frequently made on a whiteboard. In this regard, the method of Japanese Patent Application Publication No. 2004-336289, stores operations performed on a whiteboard as records together with time information in accordance with a certain rule, so that a user can identify each time point at which additions and modifications have been made on the whiteboard. However, the method of Japanese Patent Application Publication No. 2004-336289 has a problem that it is difficult to find out about, for example, the frequency of addition or modification on the whiteboard, although it is possible to find out about whether an addition or modification has been made on the whiteboard.

According to the present invention, it is possible to provide an information display processing system which identifies a time period having a large amount of object editing on an editing image shared by multiple users and which extracts the editing image in a desired state on the basis of the identified time period.

The processes by the information display processing system according to any one of the first to fifth exemplary embodiments of the present invention can be implemented by software including an information display processing program for executing the above processes. In addition, a program recording medium which stores the information display processing program according to any one of the exemplary embodiments of the present invention is also within the scope of the present invention. Examples of the program recording medium are a read only memory (ROM), a random access memory (RAM), a semiconductor memory such as a flash memory, an optical disk, a magnetic disk, and a magneto-optical disk.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An information display processing system comprising:
a display unit which displays information acquired in response to a predetermined request issued by at least one of a plurality of users who share information synchronously by use of a same editing image that is editable via a network;
a data storing circuit which stores data including user data identifying the users, editing-image data identifying the editing image, and object data identifying an object; and
a processing circuit which identifies, in response to the predetermined request, a time period having an object editing amount exceeding a predetermined threshold value, as an editing-amount increasing time period by use of the data stored in the data storing circuit and extracts an object edited in the identified editing-amount increasing time period,
wherein the processing circuit comprises
an editing-amount processing unit which identifies the editing-amount increasing time period, and
a difference processing unit which extracts the object edited in the editing-amount increasing time period,
wherein, upon receipt of an editing-amount display request for displaying an object editing amount in a particular period, the editing-amount processing unit
identifies a time period having the object editing amount in the particular period exceeding the threshold value as the editing-amount increasing time period, in response to the editing-amount display request, and
transmits an editing-amount graph of a time range of the particular period, to the display unit, the graph including a horizontal axis representing time and a vertical axis representing an editing amount per unit time,
wherein the display unit displays the editing-amount graph received from the editing-amount processing unit, and
wherein upon receipt of the editing-amount display request in a case where an object set including a plurality of objects includes figure objects and a text object, the editing-amount processing unit extracts the figure object from the object set based on the editing-amount display request, calculates an average value of sizes of the extracted figure objects, and identifies number of text characters to be arranged within a size corresponding to the calculated average value of sizes of the figure objects, so that the editing-amount processing unit collectively treats an editing amount regarding the text object in terms of character and an editing amount regarding the figure objects.

2. An information display processing system comprising:
a display unit which displays information acquired in response to a predetermined request issued by at least one of a plurality of users who share information synchronously by use of a same editing image that is editable via a network;
a data storing circuit which stores data including user data identifying the users, editing-image data identifying the editing image, and object data identifying an object; and
a processing circuit which identifies, in response to the predetermined request, a time period having an object editing amount exceeding a predetermined threshold value, as an editing-amount increasing time period by use of the data stored in the data storing circuit and extracts an object edited in the identified editing-amount increasing time period,
wherein the processing circuit comprises
an editing-amount processing unit which identifies the editing-amount increasing time period, and
a difference processing unit which extracts the object edited in the editing-amount increasing time period,
wherein, upon receipt of an editing-amount display request for displaying an object editing amount in a particular period, the editing-amount processing unit
identifies a time period having the object editing amount in the particular period exceeding the threshold value as the editing-amount increasing time period, in response to the editing-amount display request, and
transmits an editing-amount graph of a time range of the particular period, to the display unit, the graph including a horizontal axis representing time and a vertical axis representing an editing amount per unit time,
wherein the display unit displays the editing-amount graph received from the editing-amount processing unit,
wherein upon receipt of a difference display request for carrying out difference display for a specified one of the editing-amount increasing time periods, the difference processing unit
extracts an object set edited in the specified editing-amount increasing time period and transmits the extracted object set to the display unit, when the difference display request is an editing-amount-increasing-time-period difference display request for displaying an object updated in the specified editing-amount increasing time period,
extracts an object set edited before the specified editing-amount increasing time period and transmits the extracted object set to the display unit, when the difference display request is a pre-editing-amount-increasing-time-period difference display request for displaying a state of the editing image prior to the editing-amount increasing time period, and
extracts an object set edited between different editing-amount increasing time periods and transmits the extracted object set to the display unit, when the difference display request is an inter-editing-amount-increasing-time-period difference display request for displaying an object edited between different editing-amount increasing time periods, each of the different editing-amount increasing time periods corresponding to the editing-amount increasing time period, and
wherein the display unit displays the object set received from the difference processing unit.

3. The information display processing system according to claim 2, wherein, upon receipt of the inter-editing-amount-increasing-time-period difference display request,
the difference processing unit defines a rectangle surrounding at least one object edited in the editing-amount increasing time period in the editing image, as a rectangle for the editing-amount increasing time period, and
in a case where an object edited between two editing-amount increasing time periods, each corresponding to the editing-amount increasing time period, overlaps only the rectangle of one of the two editing-amount increasing time periods, the difference processing unit determines that the object has been edited in the editing-amount increasing time period having an overlap with the object,
in a case where an object edited between two editing-amount increasing time periods, each corresponding to the editing-amount increasing time period, overlaps both of the rectangles of the two editing-amount increasing time periods, the difference processing unit determines that the object edited between the two editing-amount increasing time periods has been edited in the editing-amount increasing time period having a larger overlap with the object, when overlaps between the object and one of the rectangles of the two editing-amount increasing time periods and between the object and the other editing-amount increasing time period are different in size and
determines that the object edited between the two editing-amount increasing time periods has been edited prior to the editing-amount increasing time periods, when overlaps between the object and one of the rectangles of the two editing-amount increasing time periods and between the object and the other editing-amount increasing time period are same in size, and
in a case where an object edited between two editing-amount increasing time periods, each corresponding to the editing-amount increasing time period, overlaps neither of the rectangles of the two editing-amount increasing time periods, the difference processing unit determines that the object edited between the two editing-amount increasing time periods has been edited in the editing-amount increasing time period having a smaller distance from the object, when the rectangles of the two editing-amount increasing time periods are different in distance from the object and
determines that the object edited between the two editing-amount increasing time periods has been edited prior to the editing-amount increasing time periods, when the rectangles of the two editing-amount increasing time periods are same in distance from the object.

4. The information display processing system according to claim 3, wherein the data storing circuit stores a user identifier of a user who has edited an object, in association with the object data edited by the user, and wherein, in response to a user request, the processing circuit retrieves the object data from the data storing circuit by using the user identifier as a key and identifies the editing-amount increasing time period for each user on the basis of the retrieved object data.

5. The information display processing system according to claim 3, wherein the data storing circuit stores a tag indicating content of an object by including the tag in the object data, and wherein, upon receipt of the inter-editing-amount-increasing-time-period difference display request, the difference processing unit determines which one of the two editing-amount increasing time periods includes editing of the object edited between the two editing-amount increasing time periods, on the basis of the tag indicating the content of the object.

6. The information display processing system according to claim 2, wherein, upon receipt of the inter-editing-amount-increasing-time-period difference display request, the difference processing unit defines a rectangle for the editing-amount increasing time period surrounding at least one object edited in the editing-amount increasing time period and defines at least one object-set rectangle surrounding an object set including objects edited between two editing-amount increasing time periods, each corresponding to the editing-amount increasing time period, in the editing image, and in a case where the object-set rectangle overlaps only the rectangle of one of the two editing-amount increasing time periods, the difference processing unit determines that the object set is edited in the editing-amount increasing time period having an overlap with the rectangle of the object set, in a case where the object-set rectangle overlaps both of the rectangles of the two editing-amount increasing time periods, the difference processing unit determines that the object set is edited in the editing-amount increasing time period having a larger overlap with the rectangle of the object set, when overlaps between the object-set rectangle and each of the rectangles of the two editing-amount increasing time periods are different in size and determines that the object set is edited prior to the editing-amount increasing time periods, when overlaps between the object-set rectangle and one of the rectangles of the two editing-amount increasing time periods and between the object-set rectangle and the other editing-amount increasing time period are same in size, and in a case where the object-set rectangle overlaps neither of the rectangles of the two editing-amount increasing time periods, the difference processing unit determines that the object-set rectangle is edited in the editing-amount increasing time period having a smaller distance from the object-set rectangle, when the rectangles of the two editing-amount increasing time periods are different in distance from the object-set rectangle and determines that the object set is edited prior to the editing-amount increasing time periods, when the rectangles of the two editing-amount increasing time periods are same in distance from the object-set rectangle.

* * * * *